United States Patent
Jeon et al.

(10) Patent No.: US 11,690,102 B2
(45) Date of Patent: *Jun. 27, 2023

(54) ACCESS CONTROL USING UPLINK RESOURCES

(71) Applicant: Comcast Cable Communications, LLC, Philadelphia, PA (US)

(72) Inventors: Hyoungsuk Jeon, Centreville, VA (US); Esmael Hejazi Dinan, McLean, VA (US); Kyungmin Park, Herndon, VA (US); Alireza Babaei, Fairfax, VA (US); Hua Zhou, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 180 days.

This patent is subject to a terminal disclaimer.

(21) Appl. No.: 17/159,866

(22) Filed: Jan. 27, 2021

(65) Prior Publication Data

US 2021/0227588 A1 Jul. 22, 2021

Related U.S. Application Data

(63) Continuation of application No. 16/277,746, filed on Feb. 15, 2019, now Pat. No. 10,945,290.

(Continued)

(51) Int. Cl.
*H04W 74/08* (2009.01)
*H04W 36/00* (2009.01)
(Continued)

(52) U.S. Cl.
CPC ... *H04W 74/0833* (2013.01); *H04W 36/0069* (2018.08); *H04W 36/0085* (2018.08);
(Continued)

(58) Field of Classification Search
CPC ......... H04W 56/0005; H04W 72/0413; H04W 72/0453; H04W 74/0833; H04L 27/2657; H04L 27/2692

See application file for complete search history.

(56) References Cited

U.S. PATENT DOCUMENTS 8,644,129 B2  2/2014  Dinan
8,804,632 B2  8/2014  Lee et al.
(Continued)

FOREIGN PATENT DOCUMENTS

EP   2664185 B1   6/2015
EP   3140945 A1   3/2017
(Continued)

OTHER PUBLICATIONS

R1-1711148 3GPP TSG-RAN WG1 Meeting #89, Hangzhou, China, May 15-19, 2017, Source: Qualcomm Incorporated, Title: 4-step RACH procedure consideration.
(Continued)

*Primary Examiner* — Raj Jain
(74) *Attorney, Agent, or Firm* — Banner & Witcoff, Ltd.

(57) ABSTRACT

Systems, apparatuses, and methods are described for wireless communications. A base station may configure for a wireless device access configurations on different uplink carriers, such as a supplemental uplink carrier and a non-supplemental uplink carrier. Control information may indicate that the wireless device may use a second uplink carrier, for example, if an access procedure fails on the first uplink carrier.

76 Claims, 27 Drawing Sheets

Related U.S. Application Data

(60) Provisional application No. 62/631,193, filed on Feb. 15, 2018.

(51) Int. Cl.
   *H04W 56/00* (2009.01)
   *H04W 74/02* (2009.01)
   *H04W 74/00* (2009.01)

(52) U.S. Cl.
   CPC ..... *H04W 56/001* (2013.01); *H04W 56/0005* (2013.01); *H04W 74/004* (2013.01); *H04W 74/02* (2013.01)

(56) References Cited

U.S. PATENT DOCUMENTS

| | | | | |
|---|---|---|---|---|
| 9,019,823 | B1* | 4/2015 | Raparthy | H04W 28/0247 |
| | | | | 370/230 |
| 9,781,721 | B1 | 10/2017 | Yeh | |
| 10,631,294 | B2* | 4/2020 | Harada | H04W 52/0235 |
| 10,945,290 | B2* | 3/2021 | Jeon | H04W 74/004 |
| 11,026,184 | B2* | 6/2021 | Yamada | H04W 52/18 |
| 2011/0103328 | A1 | 5/2011 | Lee et al. | |
| 2011/0188472 | A1 | 8/2011 | Jeon et al. | |
| 2013/0044700 | A1 | 2/2013 | Cheng et al. | |
| 2014/0036743 | A1 | 2/2014 | Olfat | |
| 2014/0213186 | A1* | 7/2014 | Gage | H04W 8/005 |
| | | | | 455/41.2 |
| 2015/0181453 | A1 | 6/2015 | Chen et al. | |
| 2016/0262187 | A1* | 9/2016 | Ohuchi | H04W 24/08 |
| 2016/0302076 | A1 | 10/2016 | Chou et al. | |
| 2017/0019802 | A1* | 1/2017 | Ode | H04W 48/16 |
| 2017/0223736 | A1 | 8/2017 | Yi et al. | |
| 2019/0230529 | A1* | 7/2019 | Sadiq | H04L 5/001 |
| 2019/0254074 | A1 | 8/2019 | Jeon et al. | |
| 2021/0227588 | A1* | 7/2021 | Jeon | H04W 74/004 |

FOREIGN PATENT DOCUMENTS

| | | |
|---|---|---|
| EP | 2898724 B1 | 12/2017 |
| WO | 2014055878 A1 | 4/2014 |
| WO | 2016114623 A1 | 7/2016 |
| WO | 2018182385 A1 | 10/2018 |
| WO | 2019096020 A1 | 5/2019 |

OTHER PUBLICATIONS

R1-1711279 3GPP TSG RAN WG1 NR Ad-Hoc #2, Qingdao, P.R. China, Jun. 27-30, 2017, Source: Motorola Mobility, Lenovo, Title: RACH configuration and procedure.
R1-1711383 3GPP TSG RAN WG1 NR Ad-Hoc #2, Qingdao, P.R. China, Jun. 27-30, 2017, Source: Ericsson, Title: 4-step random access procedure.
Jan. 3, 2020—European Extended Search Report—EP 19191057.9.
Jun. 29, 2020—European Office Action—EP 19157418.5.
Samsung: "Connected mode aspects of supplementary uplink frequency", 3GPP Draft; Czech Republic, Oct. 8, 2017.
Apr. 21, 2021—European Office Action—EP 19157418.5.
May 29, 2019—European Extended Search Report—19157418.5.
3GPP TSG-RAN WG2 #100: "Random Access procedure on SUL", Nov. 27, 2017.
3GPP TSG-RAN WG2 Meeting #99: "Considerations on support of supplementary uplink frequency", Aug. 21, 2017.
May 10, 2019—Extended European Search Report—19157390.6.
3GPP TS 36.423: "X2 application protocol (X2AP)", Jun. 2016.
R2-1801038 3GPP TSG-RAN2 Meeting #AH-1801, Vancouver, BC, Canada, Jan. 22-26, 2018, Source: Huawei, HiSilicon, Title: Impact of SUL on configured grant.
R2-1800620 3GPP TSG-RAN WG2 NR Ad Hoc, Vancouver, Canada, Jan. 22-26, 2018, Source: Samsung, Title: Clarification on PHR for SUL.
R2-1800687 3GPP TSG-RAN WG2 Meeting NR Ad Hoc #1801, Vancouver, Canada, Jan. 22-26, 2018, Source: Ericsson, Title: Random Access Fallback to SUL.
3GPP TS 38.423 V0.6.0 (Jan. 2018), Technical Specification, 3rd Generation Partnership Project; Technical Specification Group Radio Access Network; NG-RAN; Xn application protocol (XnAP) (Release 15).
R2-1800069 3GPP TSG-RAN2 Meeting AH #1, Vancouver, Canada, Jan. 22-26, 2018, Source: OPPO, Xiaomi, Title: Remaining issues for duplication operation.
R2-1800231 3GPP TSG-RAN2 #100, Reno, Nevada, Nov. 27-Dec. 1, 2017, Source: Xiaomi, Title: Consideration on PHR Trigger Condition for Supporting SUL.
R2-1801338 3GPP TSG-RAN2 #100, Reno, Nevada, Nov. 27-Dec. 1, 2017, Source: Xiaomi, China Unicom, CMCC, OPPO, Potevio, TCL, vivo, Title: LCP restriction for PDCP duplication consideration for SUL.
R2-1800236 3GPP TSG-RAN2 NR AH-1801, Vancouver, Canada, Jan. 22-26, 2018, Source: Xiaomi, Title: Random access failure consideration for SUL.
R2-1801626 3GPP TSG-RAN2 NR AH #0118, Vancouver, BC, Canada, Jan. 22-26, 2018, Source: Qualcomm, Title: LS on NR Idle Mode Measurements.
R2-1800343 3GPP TSG-RAN WG2 #AH NR 1801, Vancouver, Canada, Jan. 22-26, 2018, Source: Ericsson, Title: PHR format for SUL.
R2-1800373 3GPP TSG-RAN WG2 NR Ad hoc 1801, Vancouver, Canada, Jan. 22-26, 2018, Source: Samsung Electronics R&D Institute UK, Title: Preventing simultaneous Type 1 configured grants on SUL and UL.
R2-1800374 3GPP TSG-RAN WG2 AH-1801, Vancouver, Canada, Jan. 22-26, 2018, Source: Samsung Electronics R&D Institute UK, Title: Corrections to prevent simultaneous Type 1 configured grants on SUL and UL.
R2-1800517 3GPP TSG-RAN WG2 #100, Vancouver, Canada, Jan. 22-26, 2018, Source: InterDigital Inc., Title: Random Access procedure on SUL.
R2-1800619 3GPP TSG-RAN WG2 NR Ad Hoc, Vancouver, BC, Canada, Jan. 22-26, 2018, Source: Samsung, Title: SUL and PHR.
R2-1800686 3GPP TSG-RAN WG2 NR AH #3, Vancouver, BC, Canada, Jan. 22-26, 2018, Source: Ericsson, Title: Random Access Fallback to SUL.
R2-1800795 3GPP TSG-RAN WG2 NR Ad hoc 1801, Vancouver, BC, Canada, Jan. 22-26, 2018, Source: CMCC, Title: Further consideration on RA-RNTI calculation with respect to the SUL.
R2-1800796 3GPP TSG-RAN WG2 NR Ad hoc 1801, Vancouver, BC, Canada, Jan. 22-26, 2018, Source: CMCC, Title: TP on RA-RNTI calculation related to SUL operation.
R2-1800818 3GPP TSG-RAN WG2 AH-1801, Vancouver, BC, Canada, Jan. 22-26, 2018, Source: Samsung Electronics R&D Institute UK, Title: Corrections to prevent simultaneous Type 1 configured grants on SUL and UL.
R2-1800819 3GPP TSG-RAN WG2 NR Ad hoc 1801, Vancouver, BC, Canada, Jan. 22-26, 2018, Source: Samsung Electronics R&D Institute UK, Title: Preventing simultaneous Type 1 configured grants on SUL and UL.
R2-1800909 3GPP TSG-RAN WG2 Meeting NR Ad Hoc 1801, Vancouver, BC, Canada, Jan. 22-26, 2018, Source: Qualcomm Incorporated, Title: Summary for email discussion [100#32][NR] UE capabilities.
R2-1801081 3GPP TSG-RAN WG2 NR Ad hoc 1801, Vancouver, BC, Canada, Jan. 22-26, 2018, Source: ZTE, Title: Consideration on the configured grant for supporting SUL.
R2-1801111 3GPP TSG-RAN WG2 NR Ad Hoc 1801, Vancouver, BC, Canada, Jan. 22-26, 2018, Source: InterDigital Inc., Title: SUL Operation in NR Standalone.
R2-1801289 3GPP TSG-RAN WG2 NR Ad hoc 1801, Vancouver, BC, Canada, Jan. 22-26, 2018, Source: CMCC, Title: SUL impact on cell selection and reselection.
R2-1801463 3GPP TSG-RAN WG2 NR Ad hoc 1801, Vancouver, BC, Canada, Jan. 22-26, 2018, Source: MTI, Title: UL carrier switch considering SUL in RRC_Connected.

(56) References Cited

OTHER PUBLICATIONS

R2-1801620 3GPP TSG-RAN WG2 NR Ad hoc 1801, Vancouver, BC, Canada, Jan. 22-26, 2018, Source: Qualcomm Incorporated, Title: UL-DL split for EN-DC band combination signalling.
R2-1801387 3GPP TSG-RAN WG2 Ad hoc 0118, Vancouver, BC, Canada, Jan. 22-26, 2018, Source: LG Electronics Inc., Title: Support of measurement for HO with SUL.
3GPP TS 38.213 V15.2.0 (Jun. 2018), Technical Specification, 3rd Generation Partnership Project; Technical Specification Group Radio Access Network; NR; Physical layer procedures for control (Release 15).
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-1709897 3GPP TSG RAN WG1 NR Ad-hoc #2, Qingdao, P.R. China, Jun. 27-30, 2017, Source: ZIE, Title: 4-step random access procedure.
R1-1710035 3GPP TSG RAN WG1 NR Ad-Hoc #2, Qingdao, P.R. China, Jun. 27-30, 2017, Source: CATT, Title: Further details on NR 4-step RA Procedure.
R1-1710138 3GPP TSG RAN WG1 NR Ad-Hoc #2, Qingdao, P.R. China, Jun. 27-30, 2017, Source: Guangdong OPPO Mobile Telecom, Title: NR 4-Step Random Access Procedure.
R1-1710218 3GPP TSG-RAN WG1 NR Ad-Hoc #2, Qingdao, P.R. China, Jun. 27-30, 2017, Source: Mitsubishi Electric, Title: RACH transmission count.
R1-1710234 3GPP TSG-RAN WG1 NR Ad-Hoc #2, Qingdao, P.R. China, Jun. 27-30, 2017, Source: Fujitsu, Title: Discussion on 4-step RA procedure.
R1-1710271 3GPP TSG RAN WG1 NR #2, Qingdao, P.R. China, Jun. 27-30, 2017, Source: LG Electronics, Title: RACH procedure.
R1-1710422 3GPP TSG RAN WG1 Ad hoc Meeting #2, Qingdao, P.R. China, Jun. 26-30, 2017, Source: AT&T, Title: DL Tx Beam Reporting in msg. 3.
R1-1710478 3GPP TSG RAN WG1 NR Ad-Hoc Meeting, Qingdao, P.R. China, Jun. 27-30, 2017, Source: Huawei, HiSilicon, Title: RACH procedures and resource configuration.
R1-1710513 3GPP TSG RAN WG1 NR Adhoc #2, Qingdao, P.R. China, Jun. 27-30, 2017, Source: Intel Corporation, Title: 4-step PRACH procedures.
R1-1710636 3GPP TSG RAN WG1 Meeting NR AH #2, Qingdao, P.R. China, Jun. 27-30, 2017, Source: Samsung, Title: 4-step RACH procedure discussion.
R1-1710774 3GPP TSG RAN WG1 Meeting NR Adhoc, Qingdao, P.R. China, Jun. 27-30, 2017, Source: CMCC, Title: Discussion on RACH configuration.
R1-1710824 3GPP TSG RAN WG1 NR Ad-Hoc #2, Qingdao, P.R. China, Jun. 27-30, 2017, Source: MediaTek Inc., Title: On 4-step RACH procedure.
R1-1710860 3GPP TSG RAN WG1 NR Ad-Hoc #2, Qingdao, P.R. China, Jun. 27-30, 2017, Source: Sony, Title: Considerations on 4-step RA Procedure.
R1-1710871 3GPP TSG-RAN WG1 NR Ad-Hoc #2, Qingdao, P.R. China, Jun. 27-20, 2017, Source: InterDigital Inc., Title: Multiple Msg1 transmissions for one monitored RAR window.
R1-1710892 3GPP TSG RAN WG1 NR Ad-Hoc #2, Qingdao, P.R. China, Jun. 27-30, 2017, Source: Nokia, Alcatel-Lucent Shanghai Bell, Title: NR 4-step RACH procedure.
R1-1711068 3GPP TSG RAN WG1 NR Ad-Hoc #2, Qingdao, P.R. China, Jun. 27-30, 2017, Source: NTT Docomo, Inc., Title: Discussion on 4-step RA procedure for NR.

* cited by examiner

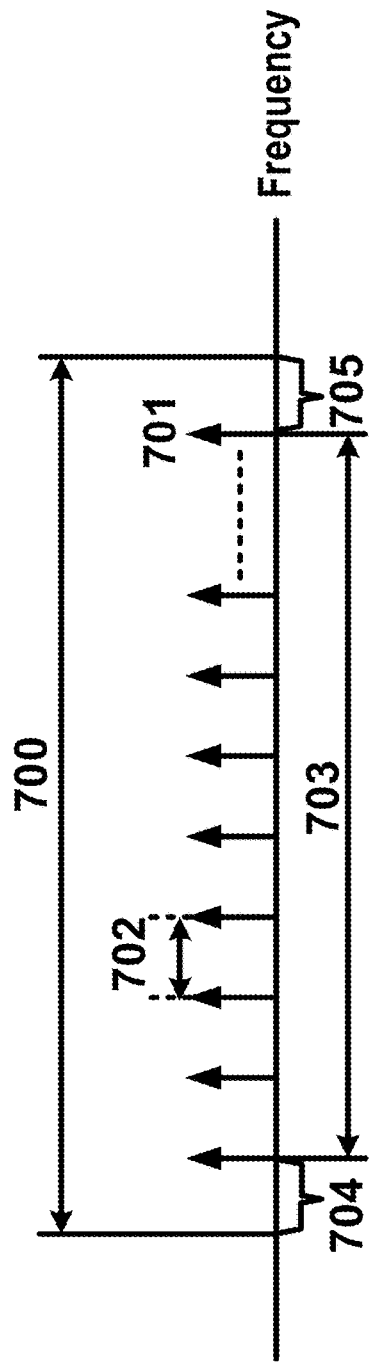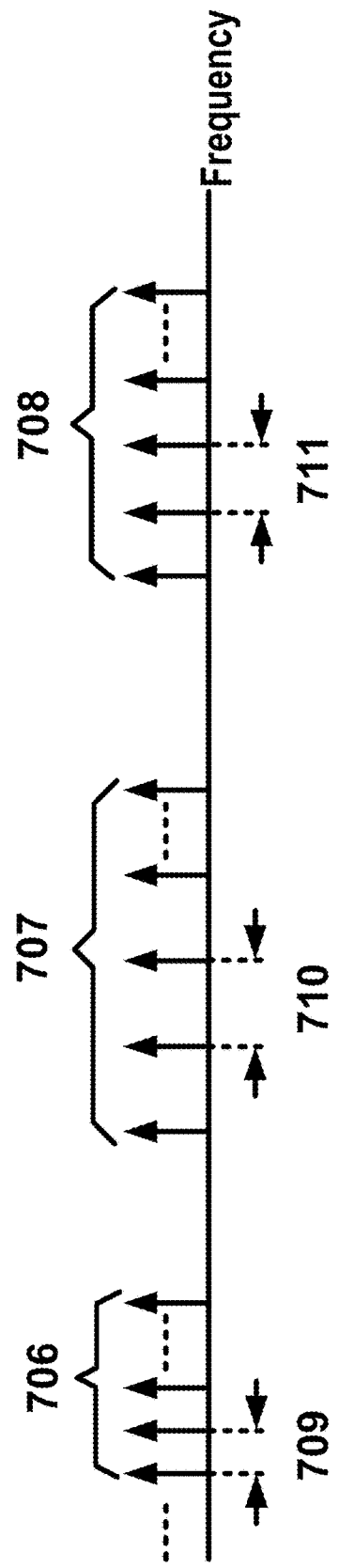

ACCESS CONTROL USING UPLINK RESOURCES

CROSS-REFERENCE TO RELATED APPLICATIONS

This application is a continuation of U.S. application Ser. No. 16/277,746, filed on Feb. 15, 2019, which claims the benefit of U.S. Provisional Application No. 62/631,193, titled "Random Access with Supplemental Uplink", filed on Feb. 15, 2018. The above-referenced applications are hereby incorporated by reference in their entirety.

BACKGROUND

A wireless device may not successfully communicate, perform a random access procedure on an uplink carrier, or the like due to a variety of reasons, such as an inefficient radio resource configuration, call dropping, radio link failure, interference with other communications, and/or timing errors. It is desired to improve wireless communications by increasing the likelihood for a successful random access procedure by a wireless device, without adversely increasing signaling overhead and/or decreasing spectral efficiency.

SUMMARY

The following summary presents a simplified summary of certain features. The summary is not an extensive overview and is not intended to identify key or critical elements.

Systems, apparatuses, and methods are described for wireless communications. A base station may send configuration information for random access procedures on different uplinks. The configuration information may be for at least one supplemental uplink carrier and at least one non-supplemental uplink carrier. A wireless device may receive one or more of configurations. The wireless device may attempt a first random access procedure using a configuration for a first uplink carrier (e.g., a non-supplemental uplink carrier). If the first random access procedure is unsuccessful, the wireless device may attempt a second random access procedure for a second uplink carrier (e.g., a supplemental uplink carrier). The wireless device may increase the likelihood of a successful random access procedure by attempting (e.g., after an unsuccessful random access procedure) a random access procedure on at least one supplemental uplink carrier.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 7A and FIG. 7B show example sets of orthogonal frequency division multiplexing (OFDM) subcarriers.

DETAILED DESCRIPTION

Figure 1:
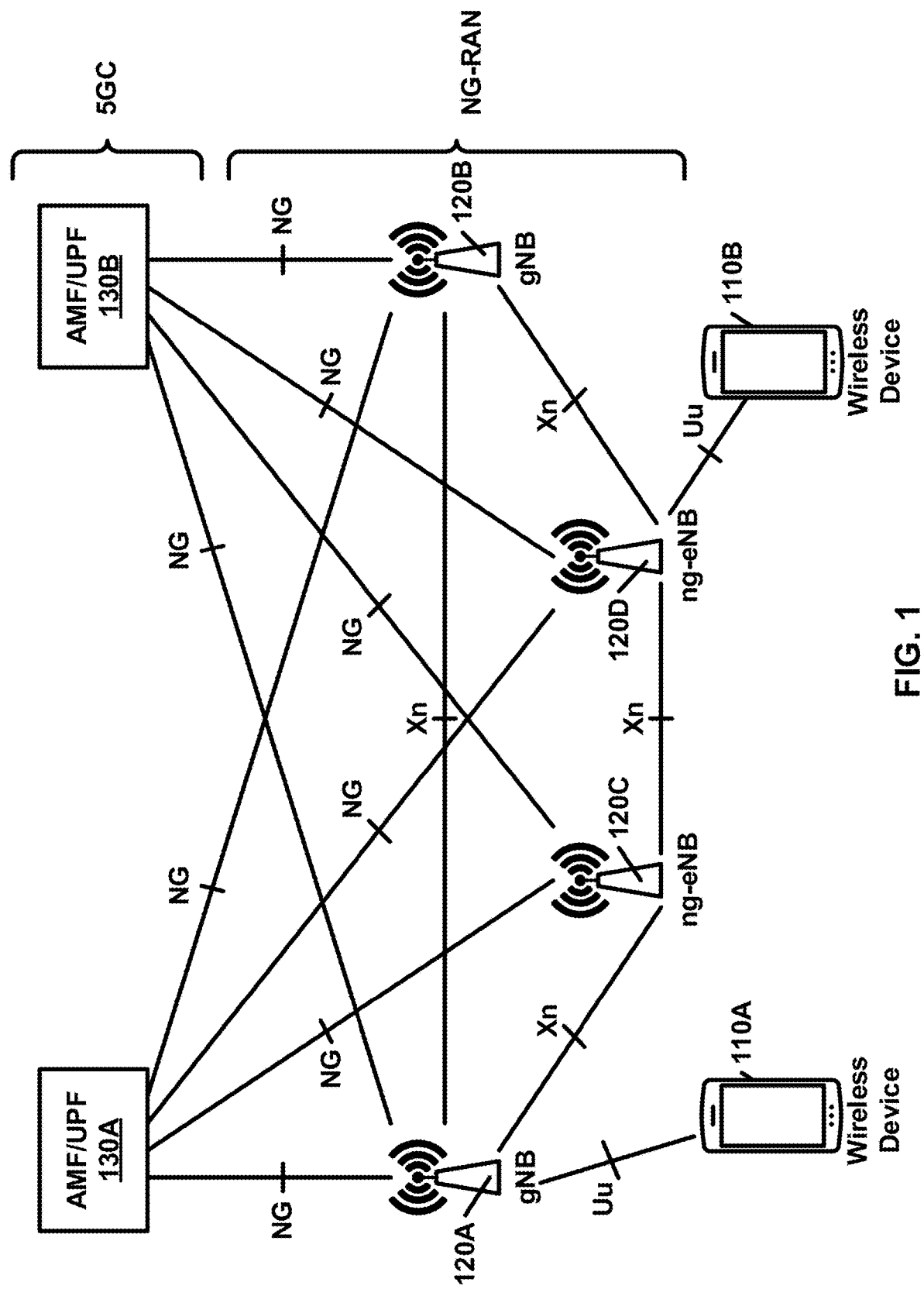
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to wireless communication systems in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement

AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., an gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
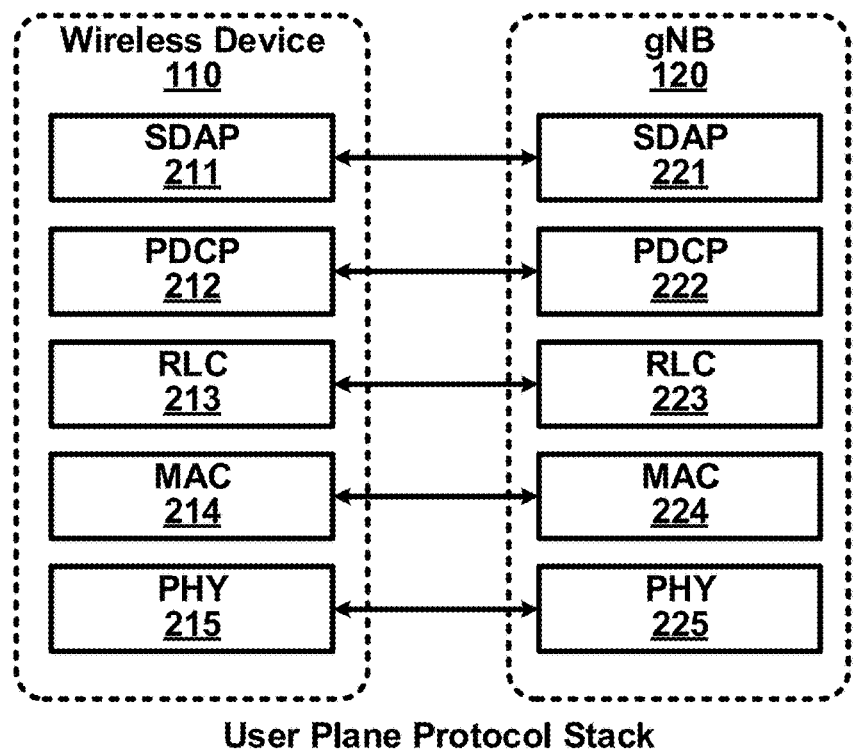
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Media Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
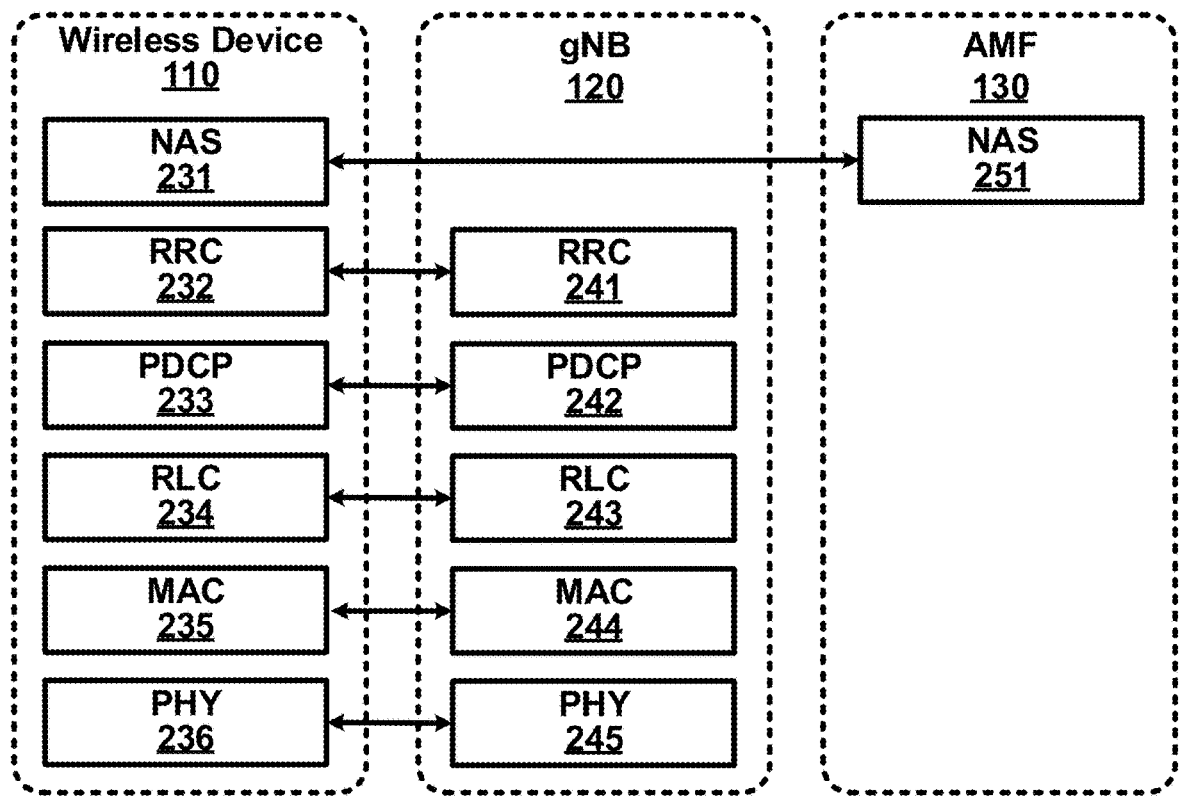
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MA CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
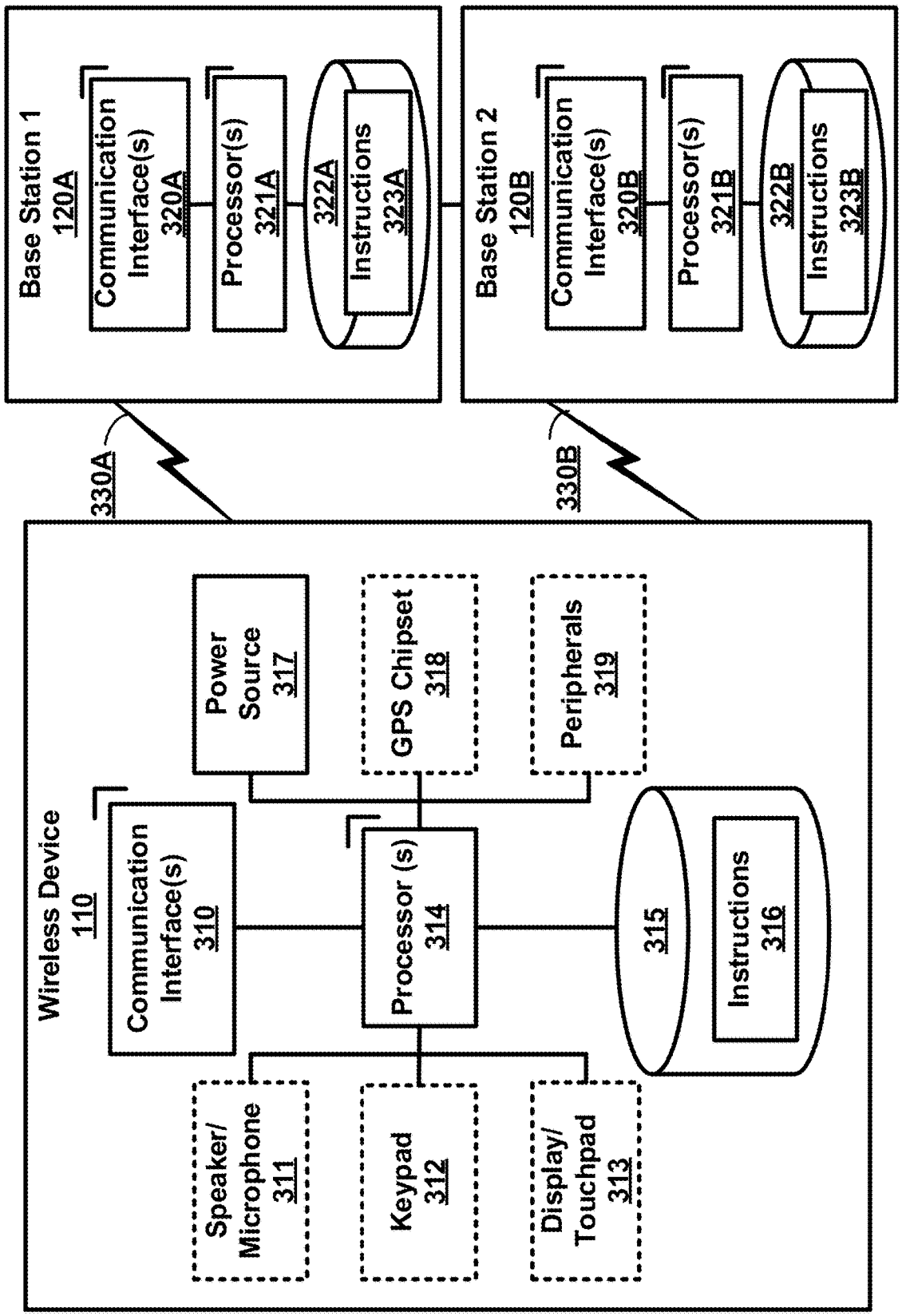
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterinformationBlock and SystemInformationBlockType1). Another SI may be transmitted via SystemInformationBlockType2. For a wireless device in an RRC_Connected state, dedicated RRC signalling may be used for the request and delivery of the other SI. For the wireless device in the RRC_Idle state and/or in the RRC_Inactive state, the request may trigger a random-access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., only static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to a E-UTRAN. The RRC-ConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figure 4A:
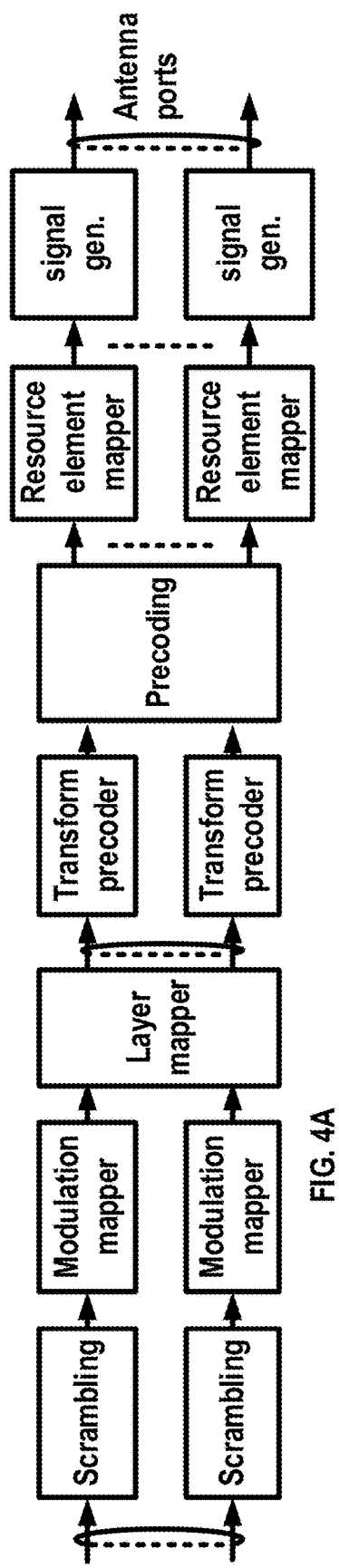
FIG. 4A, FIG. 4B, FIG. 4C and FIG. 4D show examples of uplink and downlink signal transmission.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. An CP-OFDM signal for uplink transmission may be generated by FIG. 4A, for example, if transform precoding is not enabled. These functions are shown as examples and other mechanisms may be implemented.

Figure 4B:
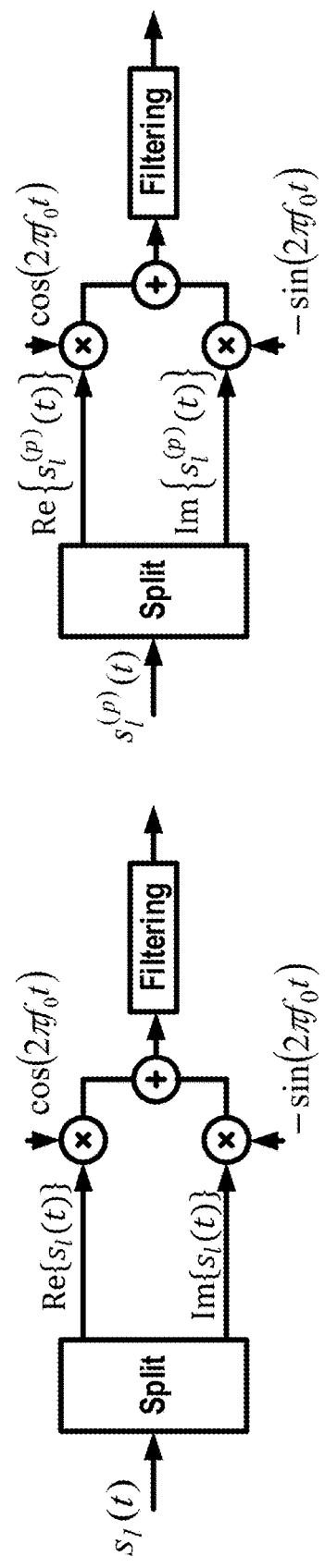

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

Figure 4D:
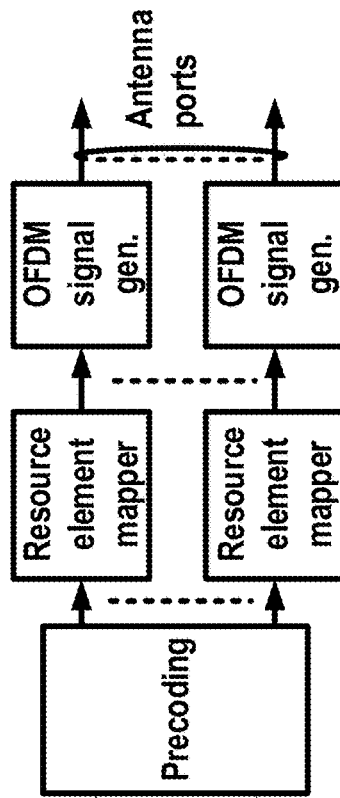
Figure 4C:
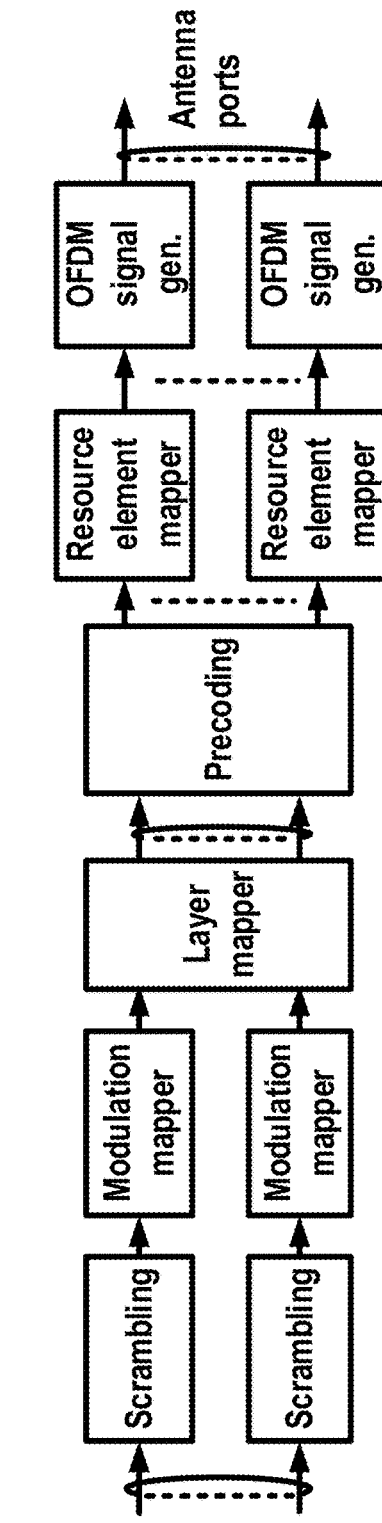

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
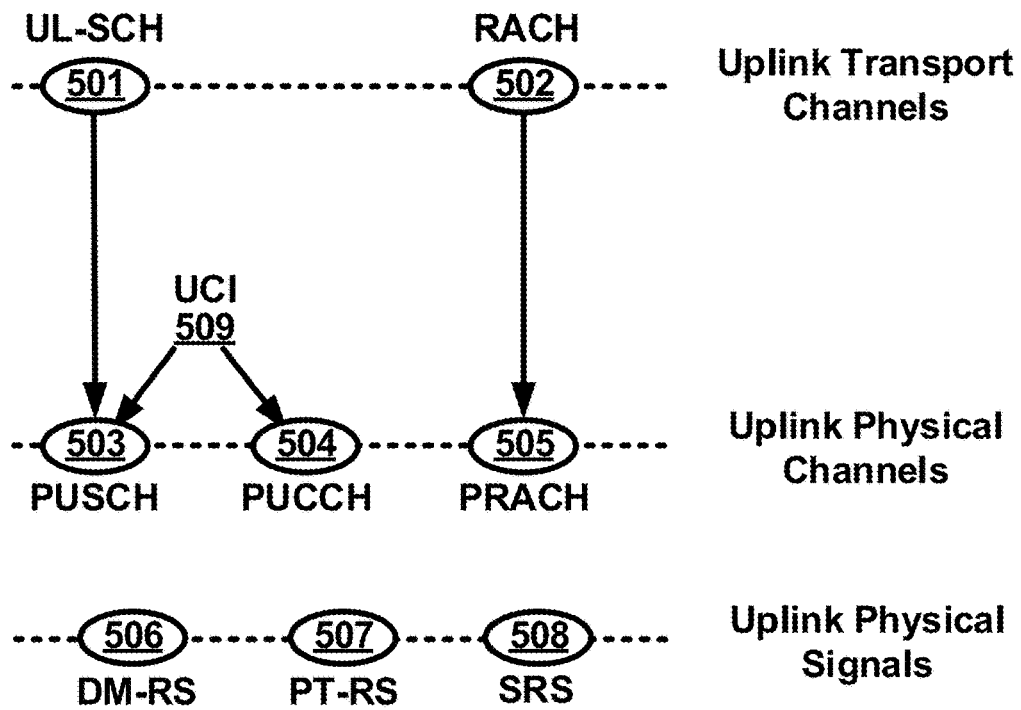
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be fewer than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
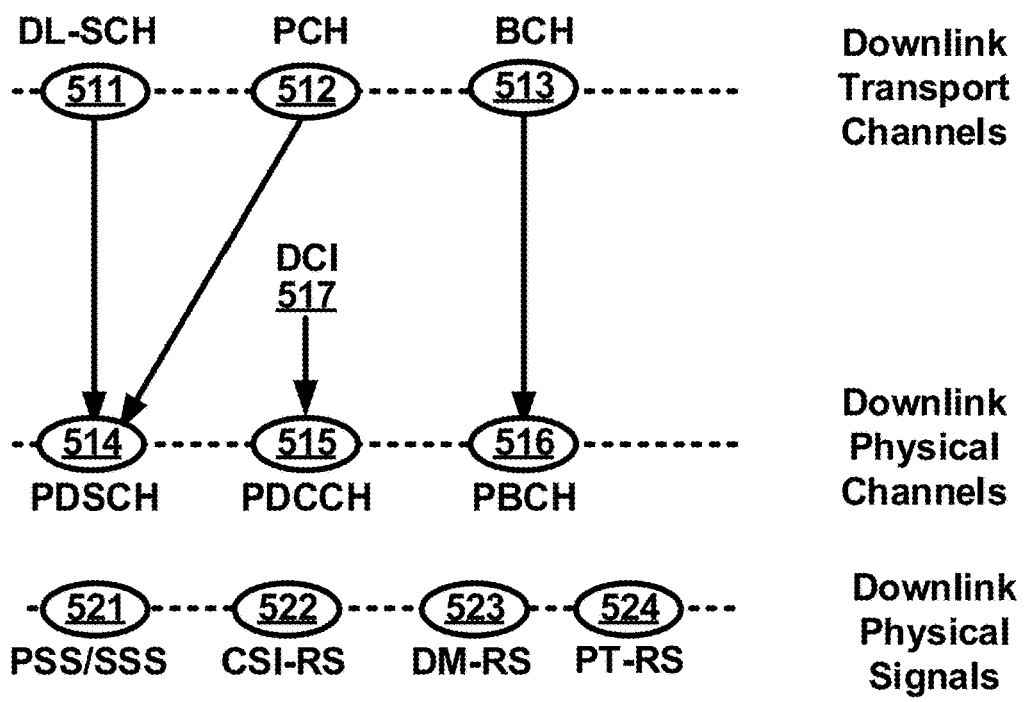
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
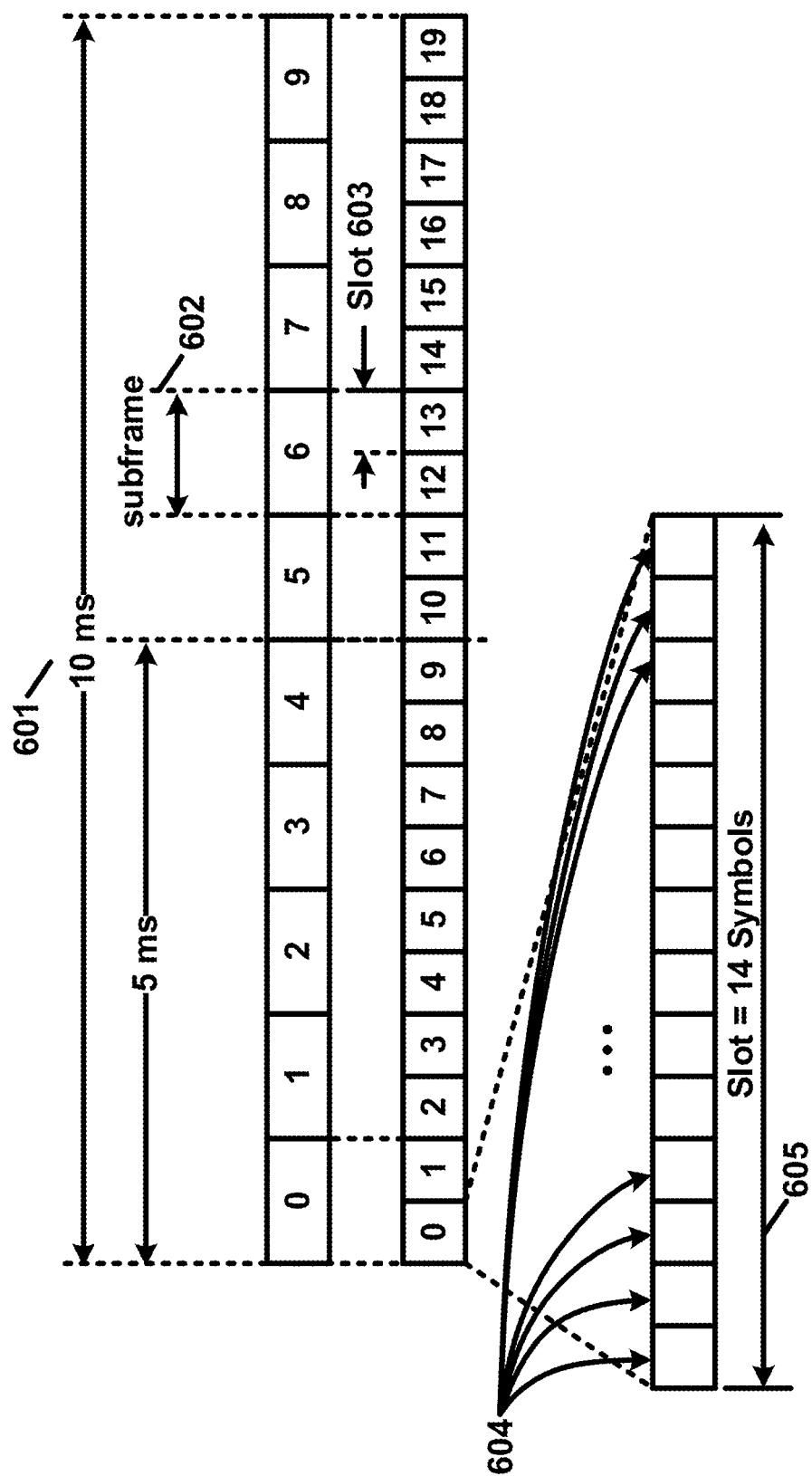
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
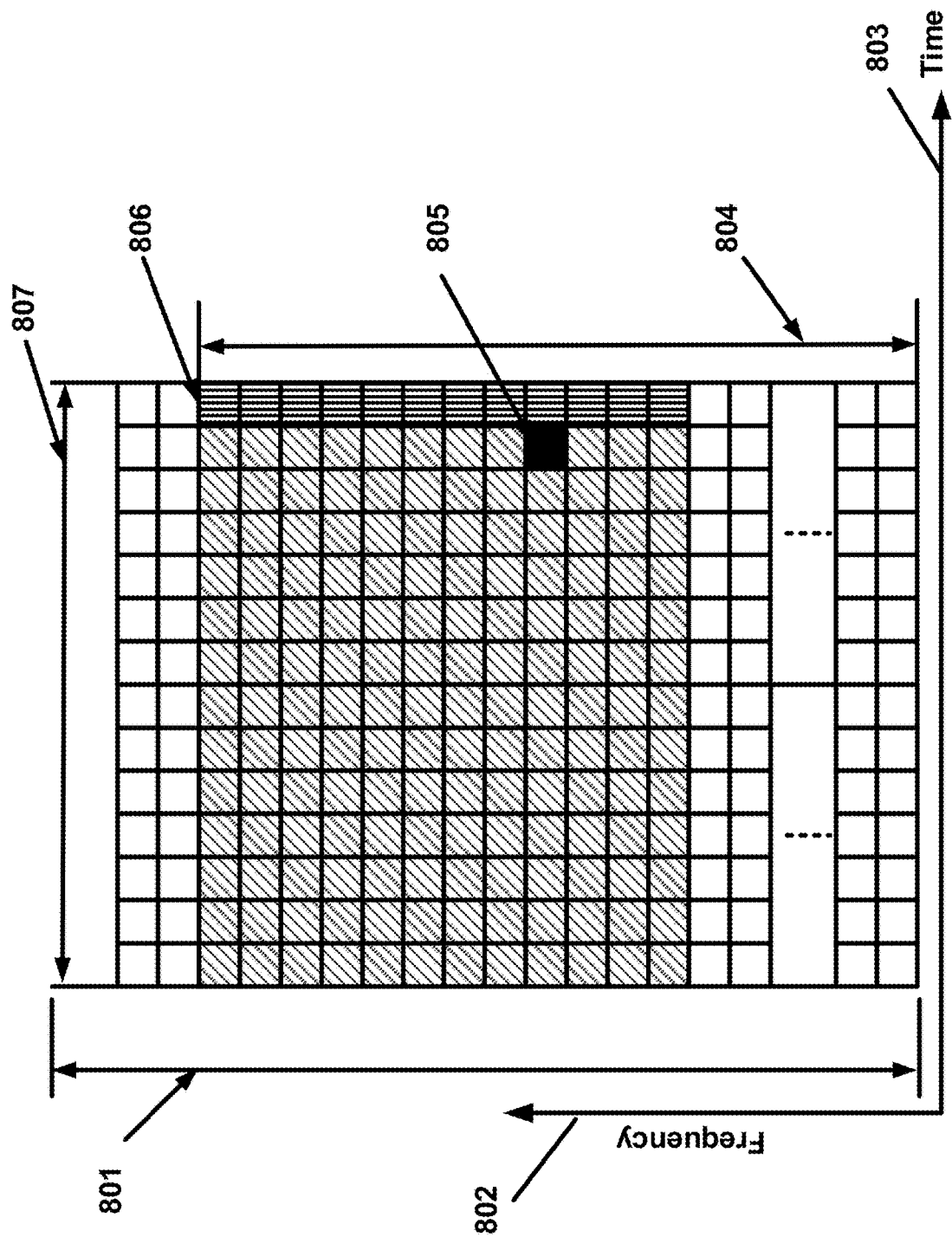
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

a base station may allocate Configured Scheduling (CS) resources for down link transmission to a wireless device. The base station may send (e.g., transmit) one or more RRC messages indicating a periodicity of the CS grant. The base station may send (e.g., transmit) a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) a DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) a DCI comprising a slot format indicator (SFI) indicating a slot format. The base station may send (e.g., transmit) a DCI comprising a pre-emption indication indicating the PRB(s) and/or OFDM symbol(s) in which a wireless device may assume no transmission is intended for the wireless device. The base station may send (e.g., transmit) a DCI for group power control of the PUCCH, the PUSCH, and/or an SRS. A DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
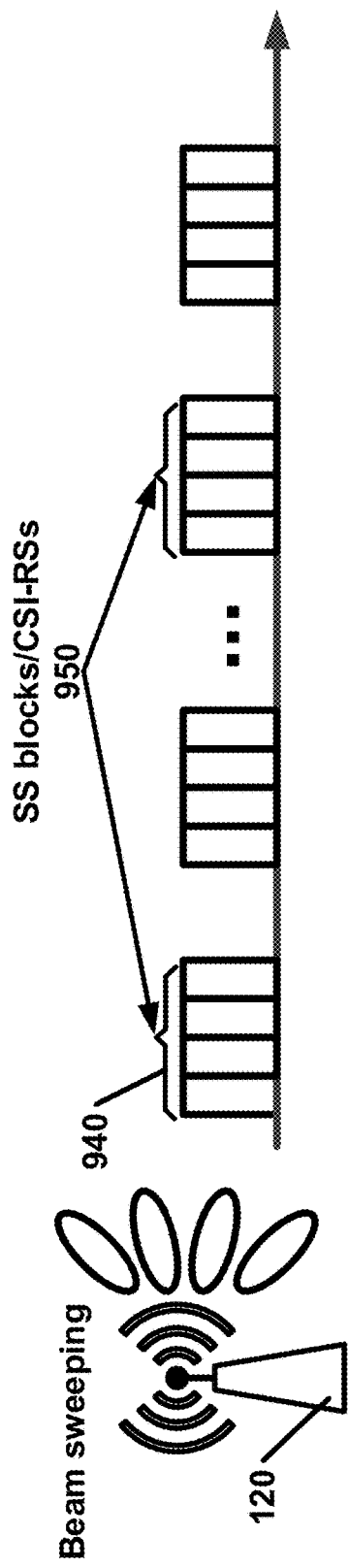
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
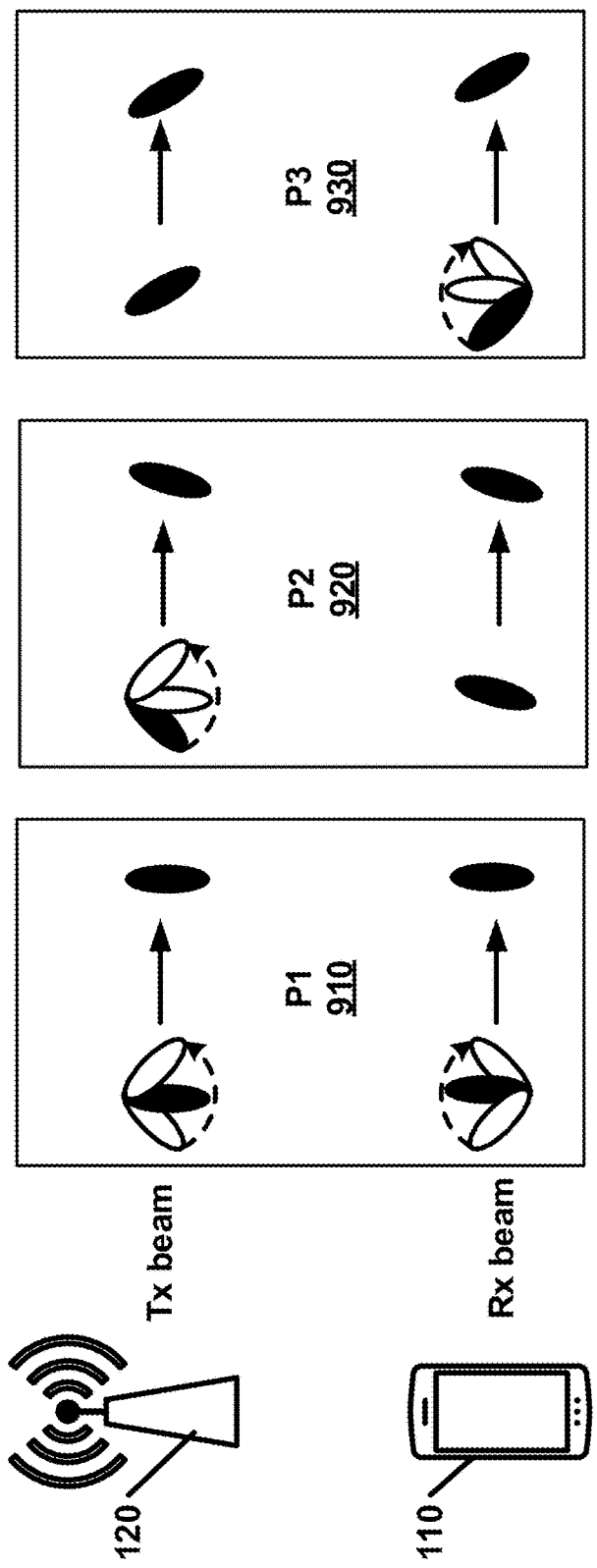
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
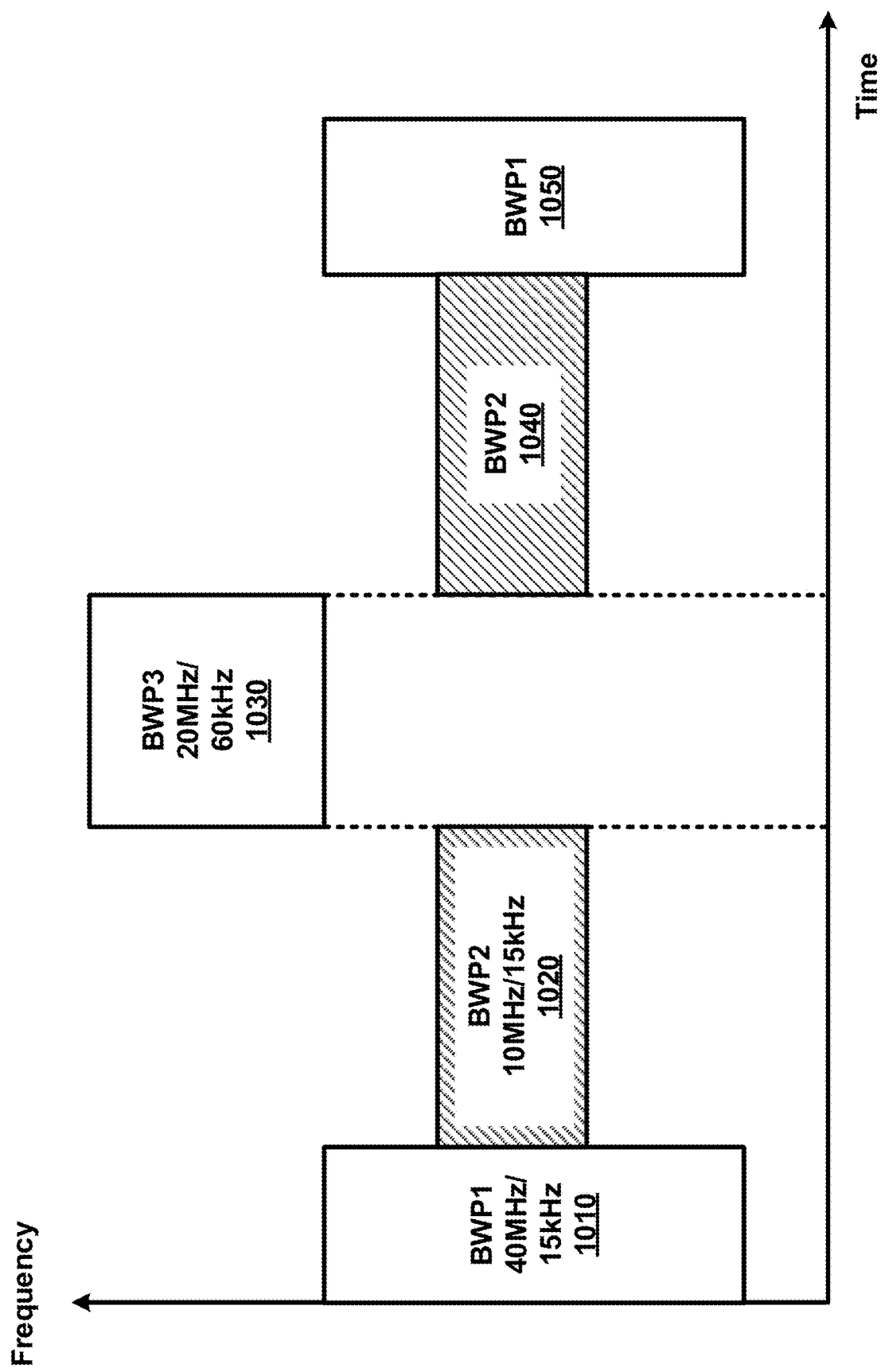
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base statin may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

A DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects a DCI indicating an active DL BWP, other than a default DL BWP, for a paired spectrum operation, and/or if a wireless device detects a DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect a DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving a DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving a DCI indicating BWP3 1030 as an active BWP. Switching an active BWP from BWP3 1030 to BWP2 1040 and/or from BWP2 1040 to BWP1 1050 may be after or in response to receiving a DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
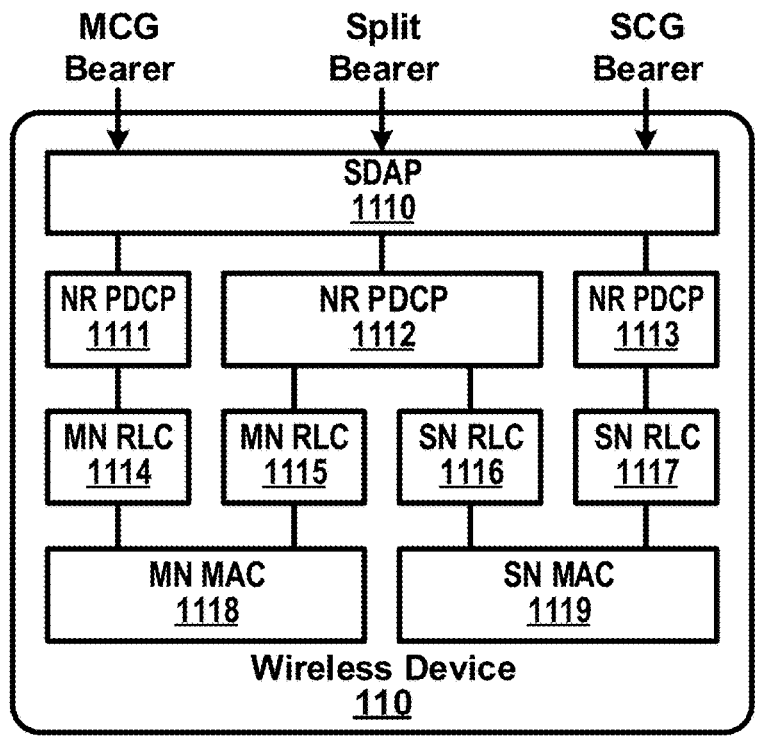
FIG. 11A and FIG. 11B show examples of multi connectivity.
Figure 11B:
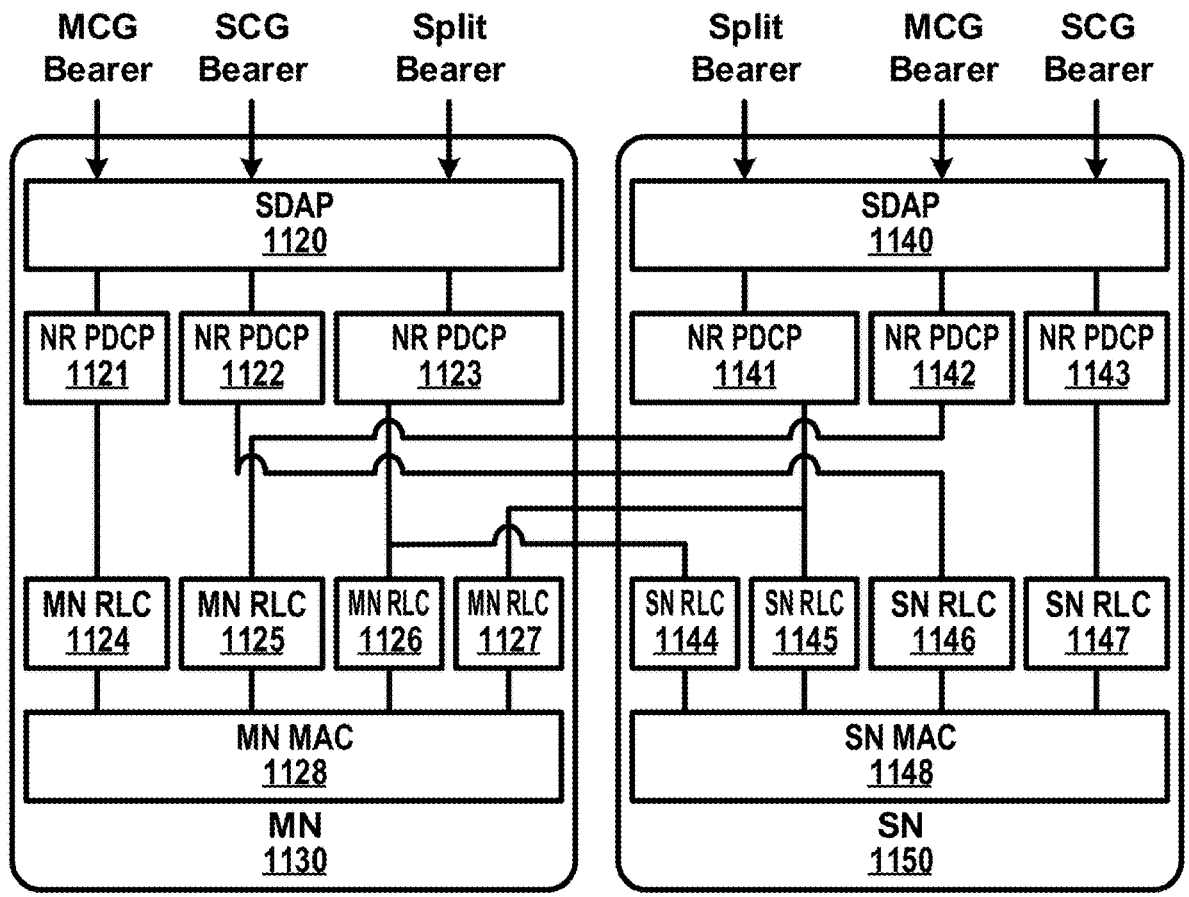

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
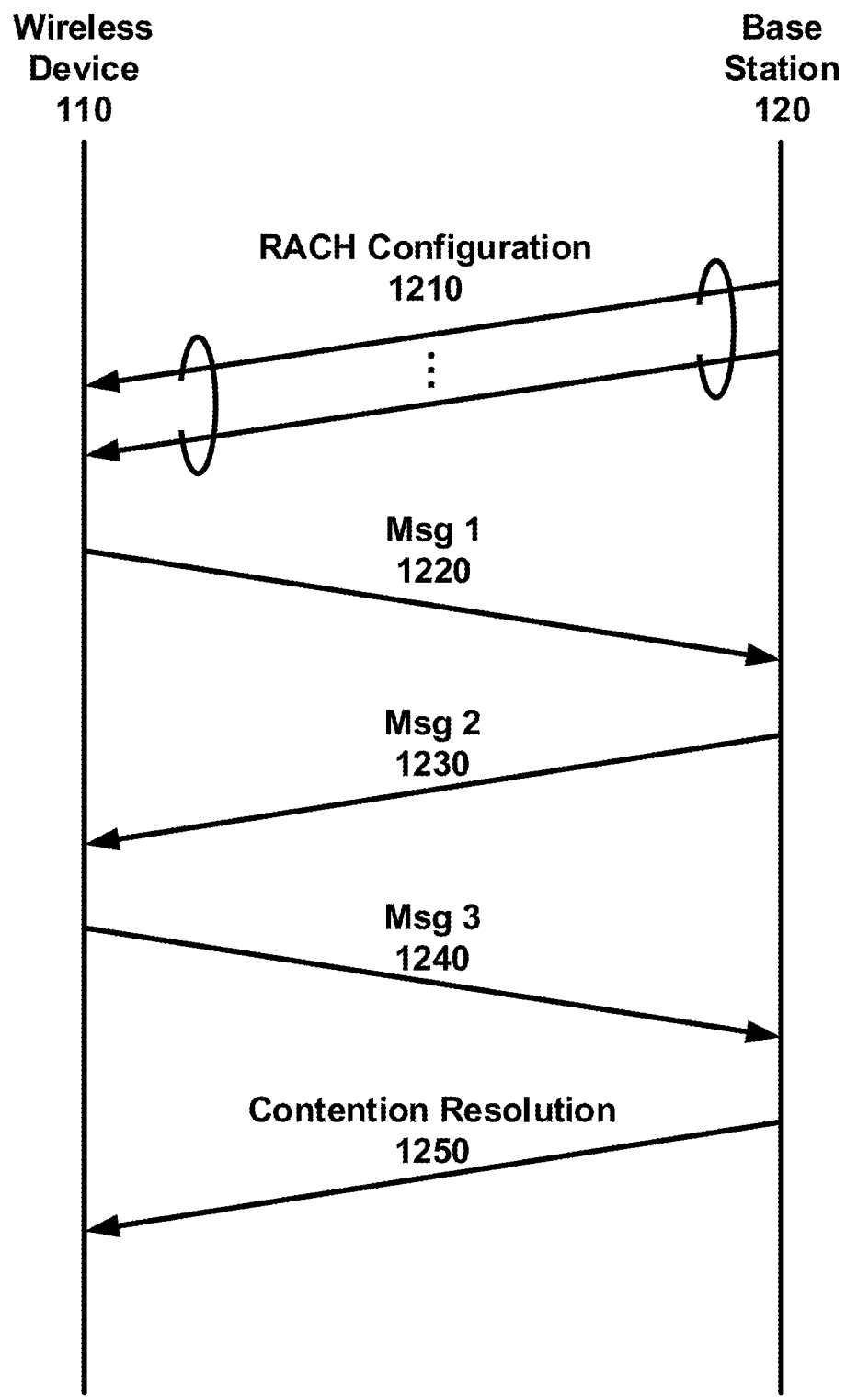
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for beam failure recovery request and corresponding PRACH resource(s) (e.g., if any), a time window to monitor RA response(s), a time window to monitor response(s) on beam failure recovery request, and/or a contention resolution timer.

The Msg 1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for beam failure recovery request associated with at least one of SS blocks and/or CSI-RSs. A wireless device may select a random access preamble index corresponding to a selected SS block or a CSI-RS from a set of one or more random access preambles for beam failure recovery request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine an PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For beam failure recovery request, the base station may configure the wireless device with a different time window (e.g., bfr-ResponseWindow) to monitor response on beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises only a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
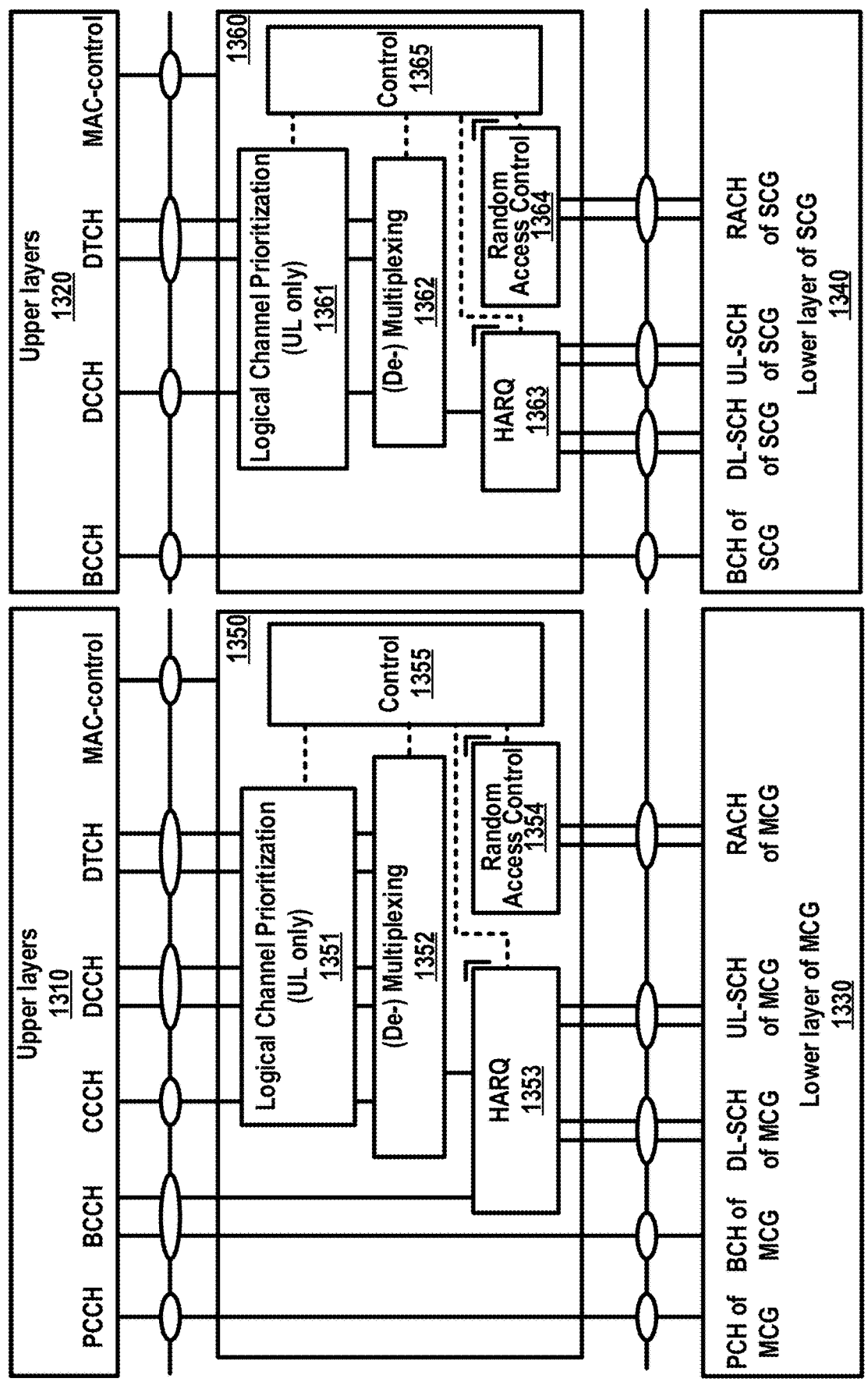
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
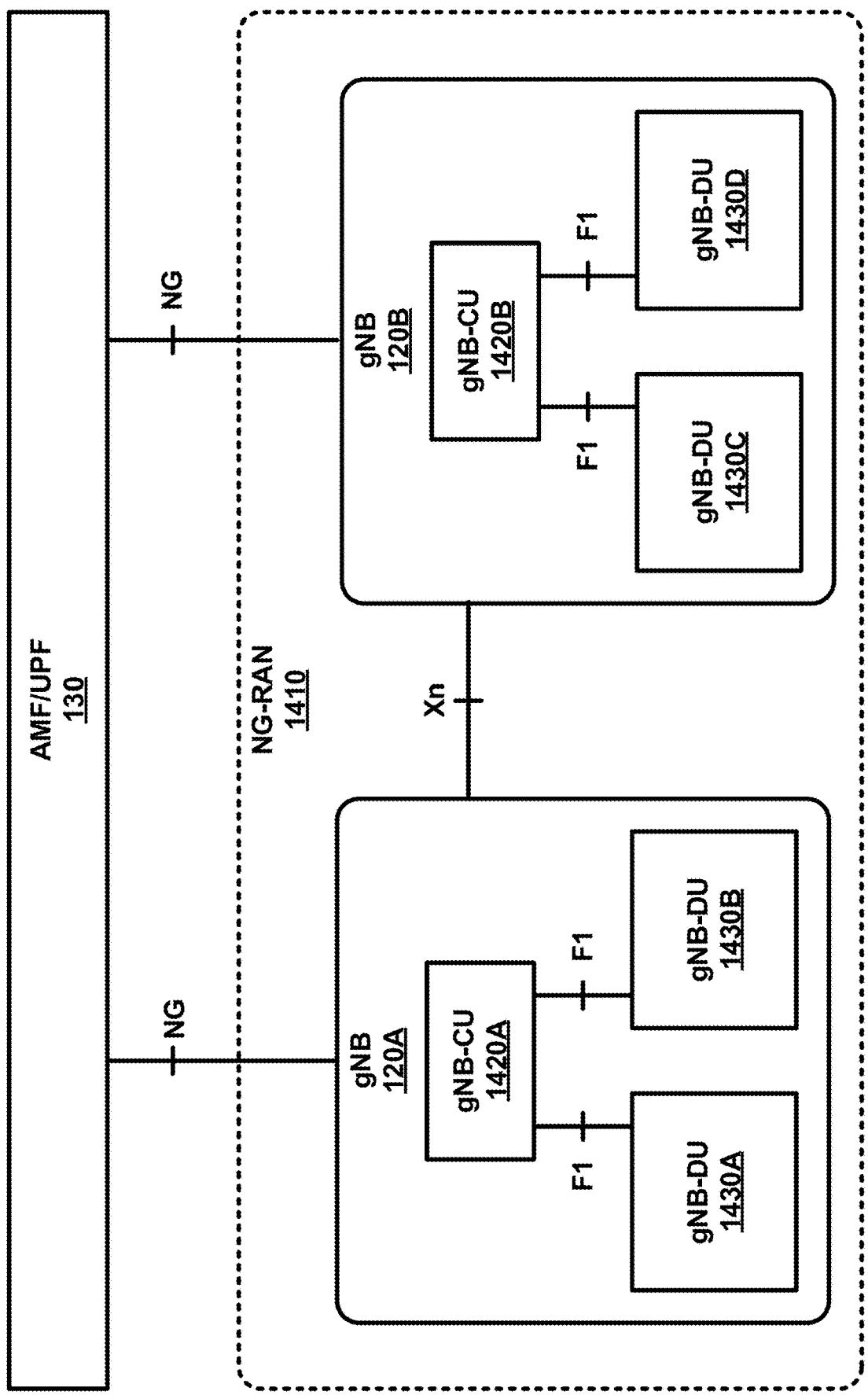
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
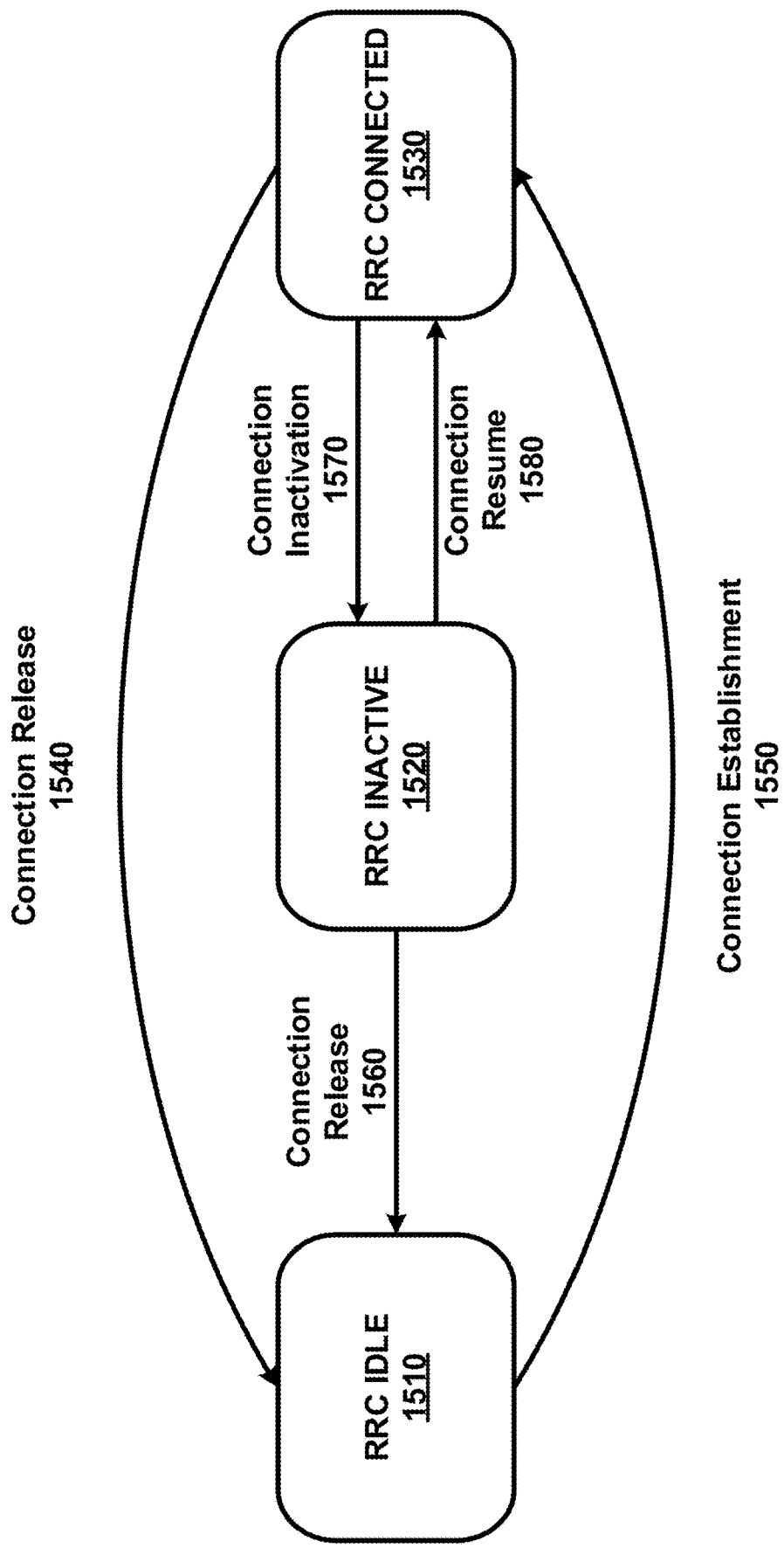
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4 stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device, via a wireless network, using one or more radio technologies (e.g., NR technologies). The one or more radio technologies may comprise one or more of: technologies related to a physical layer; technologies related to a MAC layer; and/or technologies related to an RRC layer. The one or more new radio technologies may enhance one or more features of a system incorporating radio technologies and may improve performance of a wireless network. The one or more radio technologies may increase the system throughput and/or the data rate of a data transmission. The one or more radio technologies may reduce battery consumption of a wireless device. The one or more radio technologies may reduce latency of a data transmission between a base station and a wireless device. The one or more radio technologies improve and/or expand a network coverage of a wireless network. The one or more radio technologies may improve transmission efficiency of a wireless network.

A base station may configure a wireless device with one or more UL carriers associated with a DL carrier of a cell. The one or more UL carriers configured with a DL carrier may comprise a supplementary uplink (SUL) carrier and/or a non-SUL carrier. The non-SUL carrier may be a normal UL (NUL) carrier. A DL carrier of a cell and an NUL carrier of the cell may be the same carrier, for example, such as in a TDD configuration. One or more first time durations (e.g., a slot, a subframe, a mini-slot, etc.) of a carrier may be assigned for a DL resource of the cell, and one or more second time durations (e.g., a slot, a subframe, a mini-slot, etc.) of the carrier may be assigned for an NUL resource of the cell. For an FDD configuration, a DL carrier of a cell and an NUL carrier of the cell may be different. A base station may assign at least one (e.g., default) NUL carrier, of a cell, that corresponds to a DL carrier of the cell, for example, in an FDD configuration. An SUL carrier corresponding to the DL carrier may or may not be configured for the cell. The SUL carrier may be configured for one or more wireless devices located within the coverage of the SUL carrier.

One or more SUL carriers may be configured for the cell to supplement the at least one default NUL carrier. One or more SUL carriers may be configured to expand an uplink coverage of the cell. The base station may enhance the UL coverage and/or capacity of the cell by configuring one or more SUL carriers. An SUL carrier may have an uplink coverage greater than an uplink coverage of an NUL carrier. A base station may configure a BWP configuration per an uplink (e.g., per an uplink carrier) in a cell. A base station may configure one or more BWPs on an SUL carrier separately from one or more BWPs on a non-SUL carrier. A base station may control an active BWP of an SUL carrier independently of an active BWP of a non-SUL carrier. A base station may control two uplink transmissions on two ULs (e.g., a non-SUL and an SUL) to avoid overlapping PUSCH transmissions in time. A first PUSCH transmission via a non-SUL carrier may not overlap in time with a second PUSCH transmission via an SUL carrier.

A base station may avoid configuring parallel uplink transmissions via an SUL and a non-SUL of a cell. The parallel uplink transmissions may be a first PUCCH (and/or PUSCH) transmission via an SUL and a second PUCCH (and/or PUSCH) transmission via a non-SUL, which may at least partially overlap in time. A base station may send (e.g., transmit) one or more RRC messages (e.g., wireless device specific RRC signaling) to (re-)configure a location of a PUCCH on an SUL carrier and/or on a non-SUL carrier. A base station may send (e.g., transmit), to a wireless device, one or more RRC messages comprising configuration parameters for a carrier. The configuration parameters may indicate at least one of: one or more random access procedure configurations; one or more BWP configurations (e.g., the number of DL/UL BWPs, a bandwidth of each BWP, an index of the configured DL/UL BWPs, and/or initial, default, and/or active DL/UL BWPs); one or more PUSCH configurations; one or more PUCCH configurations; one or more SRS configurations; and/or one or more power control parameters.

A base station may configure an SUL carrier and a non-SUL carrier to support a random access procedure (e.g., a random access procedure for an initial access). A plurality of RACH configurations may be configured for the SUL and the non-SUL. To support a random access to a cell configured with an SUL, a base station may configure a RACH configuration, such as the RACH configuration 1210 shown in FIG. 12, for an SUL. The RACH configuration for an SUL may be independent of a RACH configuration for a non- SUL. One or more parameters associated with the Msg 1 1220, Msg 2 1230, Msg 3 1240, and/or contention resolution 1250 in FIG. 12 via an SUL carrier may be configured independently of one or more parameters associated with the Msg 1 1220, Msg 2 1230, Msg 3 1240, and/or contention resolution 1250 in FIG. 12 via a non-SUL carrier. One or more parameters associated with a PRACH transmission in the Msg 1 1220 via a SUL may be independent of one or more parameters associated with a PRACH transmission in the Msg 1 1220 via a non-SUL.

A wireless device may determine which carrier (e.g., between a non-SUL and an SUL) to use for a random access procedure. The wireless device may determine which carrier to use, for example, based on a measurement (e.g., an RSRP measurement) of one or more DL pathloss references. A wireless device may select a first carrier (e.g., an SUL or a non-SUL carrier), for example, if a measured signal quality (e.g., RSRP) of DL pathloss references is lower than a broadcast and/or semi-statically configured threshold (e.g., an RRC parameter, sul-RSRP-Threshold). If a wireless device selects a carrier between an SUL carrier and a non-SUL carrier for a random access procedure, one or more uplink transmissions associated with the random access procedure may remain on the selected carrier.

A base station may configure a non-SUL and an SUL with a TAG. For an uplink transmission of a first carrier (e.g., an SUL) of a cell, a wireless device may use a TA value received during a random access procedure via a second carrier (e.g., a non-SUL) of the cell.

Figure 16:
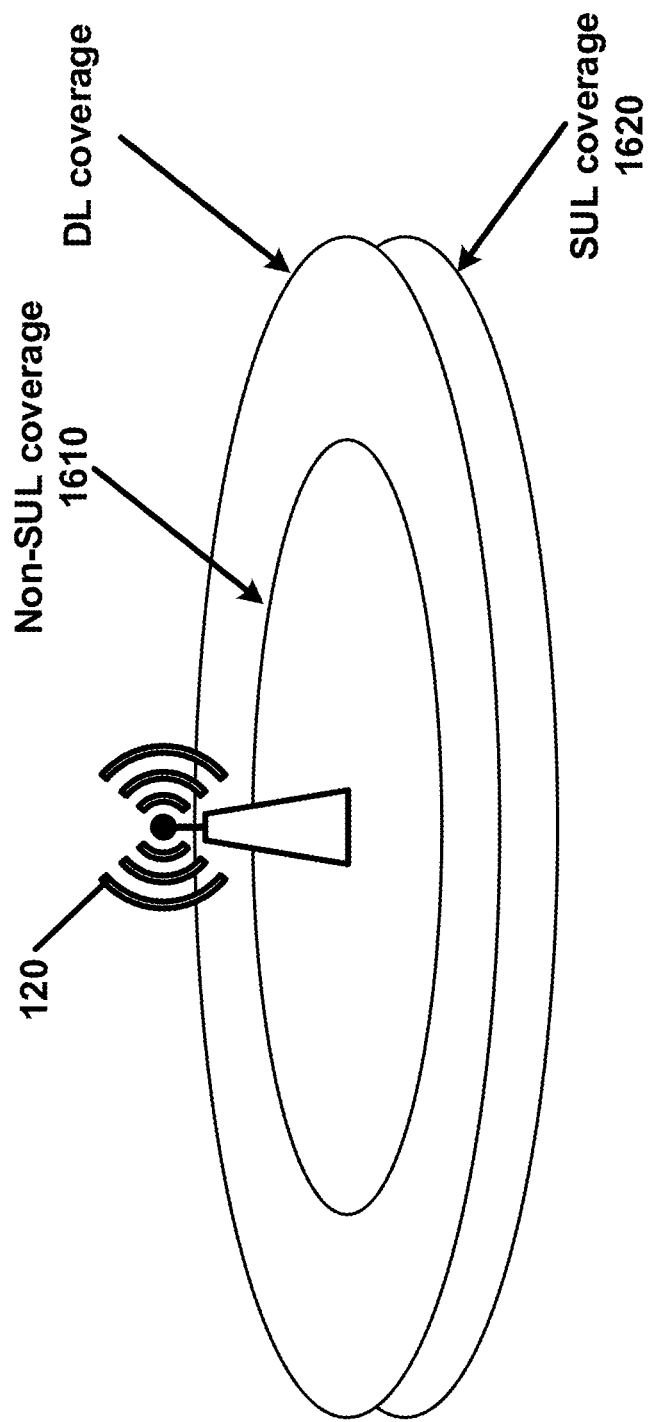
FIG. 16 shows an example cell coverage.

FIG. 16 shows an example of a coverage of a cell configured with a DL and at least two ULs comprising a non-SUL and an SUL. A base station may configure a non-SUL and a DL over a first frequency (e.g., a high frequency, for example, greater than 6 GHz). An SUL may be configured over a second frequency (e.g., a low frequency, for example, less than 6 GHz) to support an uplink transmission (e.g., in terms of coverage and/or capacity) of the cell and to supplement the configured non-SUL. A broadcast threshold (e.g., an RRC parameter, sul-RSRP-Threshold) for a wireless device to select a carrier may be determined such that a wireless device located outside a non-SUL coverage 1610 but inside an SUL coverage 1620 may start a random access procedure via an SUL. A wireless device located inside the non-SUL coverage 1610 may start a random access procedure via a non-SUL. A wireless device may use a RACH configuration associated with a selected carrier for a random access procedure.

A wireless device may perform a contention-based random access procedure or a contention-free random access procedure. A wireless device may perform a random access procedure via a UL selected based on a broadcast threshold, for example, if a base station does not indicate (e.g., explicitly), to the wireless device, a particular carrier to start a random access procedure. A base station may indicate a particular carrier via which a wireless device is allowed to perform a random access procedure. The base station may indicate the particular carrier by transmitting a RACH configuration with a value of a UL carrier indicator (e.g., a first value, for example, "0" may indicate a non-SUL carrier and a second value, for example, "1" may indicate an SUL carrier). A base station may indicate (e.g., explicitly), to a wireless device, which UL carrier to be used for a contention-free random access procedure and/or a contention-based random access procedure. A base station may indicate a contention-free random access procedure by transmitting a RACH configuration with a dedicated preamble index. A base station may indicate a contention-based random access procedure by transmitting a RACH configuration without a dedicated preamble index.

A network may use one or more received measurements of non-SUL carrier(s) and/or SUL carrier(s) to initiate a (contention-free or contention-based) random access procedure for a wireless device. A base station may configure a wireless device (e.g., a wireless device in an RRC Connected state) with one or more measurements on one or more DL reference signals of a cell that are associated with non-SUL carrier(s) of the cell and/or associated with SUL carrier(s) of the cell. A base station may select a carrier between non-SUL carrier(s) and/or SUL carrier(s) based on one or more measurement reports (e.g., quality information of one or more measurements on the one or more DL reference signals), for example, if the base station receives, from the wireless device, the one or more measurement reports. A base station may indicate, to a wireless device, a selected UL carrier via RRC signaling (e.g., for a handover) and/or a PDCCH order (e.g., for an SCell addition) for initiating a (contention-free or contention-based) random access procedure. A base station may select one of a non-SUL carrier and an SUL carrier based on congestion states in non-SUL carrier(s) and/or SUL carrier(s), for example, for a load balancing between the non-SUL carrier(s) and the SUL carrier(s). Based on one or more measurement reports of DL reference signals associated with non-SUL carrier(s) and/or SUL carrier(s), a base station may better select a carrier (e.g., a non-SUL or an SUL) of a target cell for a (contention-free or contention-based) random access procedure (e.g., for a handover). Based on one or more measurement reports of DL reference signals associated with non-SUL carrier(s) and/or SUL carrier(s), a base station may better select a carrier (e.g., a non-SUL or an SUL) of an SCell (e.g., if the SCell is configured with at least a non-SUL carrier and a SUL carrier) for a (contention-free or contention-based) random access procedure (e.g., for an SCell addition).

For a handover of a wireless device, a source base station may determine a handover to a target base station. A source base station may send an indication of a handover decision to a target base station. The target base station may be associated with one or more target cells that are selected by the source base station. The one or more target cells selected by the source base station may belong to the target station. A target base station may indicate, via a handover command (e.g., that is transmitted through a cell of a source base station) and to a wireless device, which carrier (between non-SUL carrier(s) and SUL carrier(s)) is to be used for a handover. For example, the handover command received by the wireless device may comprise an SUL indicator (e.g., 1 bit) and may comprise one or more RACH parameters (e.g., a dedicated preamble index and/or a PRACH mask index). The SUL indicator may indicate an SUL carrier or a non-SUL carrier. The one or more RACH parameters may be associated with a UL carrier (e.g., the SUL carrier or the non-SUL carrier) indicated by the SUL indicator. The wireless device may perform a random access procedure, based on the one or more RACH parameters, on the UL carrier indicated by the SUL indicator.

A source base station may send, to a target base station, the one or more measurement reports and/or measurement results on non-SUL carrier(s) (e.g., high frequency carrier(s)) and SUL carrier(s) (e.g., low frequency carrier(s)) so that the target base station may determine a carrier via which the wireless device may perform a (contention-free or contention-based) random access procedure for a handover.

The source base station may need to know whether SUL carrier(s) is (are) configured in the target base station and/or which carrier is allowed to be used for the handover, for example, if the source base station configures DL measurements on one or more cells associates with non-SUL carrier(s) and/or SUL carrier(s) of the target base station. For example, the target base station may inform the source base station of one or more configurations of non-SUL carrier(s) and/or SUL carrier(s) of one or more cells in the target base station. The source base station may configure DL measurements on one or more cells of the target base station, for example, based on one or more configurations indicating carrier configurations at the one or more cells of the target base station.

For an SCell addition, a base station may be informed of whether SUL carrier(s) is (are) configured in an SCell and/or which carrier is allowed to be used for an SCell addition. A base station may configure DL reference signals for measurements on non-SUL carrier(s) and/or SUL carrier(s). A base station may configure a wireless device with one or more RACH configurations for an SCell (e.g., a first RACH configuration for an SUL carrier, a second RACH configuration for a non-SUL carrier, etc.). A base station may send (e.g., transmit), to a wireless device, a PDCCH order comprising a parameter indicating a particular carrier via which the wireless device starts a (contention-free or contention-based) random access procedure. For example, a PDCCH order initiating a (contention-free or contention-based) random access procedure may comprise one or more parameters indicating one or more of: one or more preambles (e.g., a preamble index), one or more PRACH resources (e.g., a PRACH mask index), an SUL indicator, and/or a BWP indicator. For a random access procedure, a wireless device receiving a PDCCH order may transmit at least one preamble (e.g., corresponding to a preamble index indicated by the PDCCH order) via one or more PRACH resources (e.g., corresponding to a PRACH mask index indicated by the PDCCH order) of a BWP indicated by a BWP indicator of a carrier indicated by an SUL indicator.

A wireless device may determine that a random access procedure has been unsuccessfully completed, for example, if the wireless device receives no random access response (RAR) corresponding to one or more preambles transmitted by the wireless device during the random access procedure. There may be a number (e.g., quantity, amount, etc.) of allowed preamble transmissions (e.g., ra-PreambleTx-Max) during a random access procedure. The number of allowed preamble transmissions may be semi-statically configured by RRC signaling. A wireless device may determine that a random access procedure has been unsuccessfully performed, for example, if the wireless device receives no RAR after the number of preamble transmissions. A wireless device may indicate a problem to upper layer(s), for example, after or in response to an unsuccessful performance of a random access procedure. The upper layers(s) may trigger a radio link failure that may lead to a prolonged random access delay and degraded user experience. The radio link failure may be triggered, for example, based on the indicated problem. A base station (e.g., a source base station and/or a target base station) configuring a wireless device with a RACH configuration for a random access (for a handover and/or an SCell addition) may not allow to reuse the RACH configuration, for example, if the random access is unsuccessfully performed.

A failure of a (contention-free or contention-based) random access procedure may result in a long delay before starting the next random access procedure. If a contention-free random access is unsuccessfully performed, a wireless device may initiate a contention-based random access procedure instead of another content-free random access procedure. If a wireless device fails a contention-free random access to a target base station during a handover, the wireless device may perform an initial access to the target base station based on a contention-based random access. A wireless device performing a contention-based random access procedure may compete with one or more wireless devices to gain an access to a base station, which may not guarantee a success of the contention-based random access procedure. The contention-based random access procedure may take more time (e.g., the four-step procedure of the contention-based random access procedure comparing with the two-step procedure of a contention-free random access comprising MSG 1 1220 and MSG 2 1230 transmissions) to receive a corresponding RAR.

If a wireless device determines a failure of a contention-free random access for an SCell addition, the wireless device may wait until a base station transmits a second control message (e.g., a PDCCH order) indicating a RACH configuration. Based on the second control message indicating the RACH configuration, the wireless device may initiate a random access for an SCell addition. It may take a long time for a base station to detect a failure of a random access for an SCell addition. A wireless device may wait for the second control message (e.g., a PDCCH order) for a long time.

The failure of a contention-free random access may result in a degraded user experience (e.g., in terms of QoS, capacity (throughput), and/or coverage). For example, a failure of a random access (e.g., a contention-free random access) during a handover may cause a call drop. A failure of a random access (e.g., a contention-free random access) for an SCell addition may cause a cell congestion (e.g., load imbalancing) on one or more existing cells An SCell may not take over traffic from the one or more existing cells in time, which may cause a cell congestion to occur. A failure of a random access for an SCell addition may cause insufficient capacity that cannot support QoS requirements. The insufficient capacity may occur because of the failure of the SCell addition. An enhanced random access procedure may improve user experience, avoid call drop in a handover, and/or avoid a cell congestion of one or more multiple cells.

For a random access event, a base station (e.g., a source base station and/or a target base station) may provide a wireless device with a plurality of RACH configurations for a plurality of uplink resources. The wireless device may transmit a plurality of random access messages, for example, based on the plurality of RACH configurations. For example, if a wireless device unsuccessfully performs a first random access procedure using a first RACH configuration of the plurality of RACH configurations, the wireless device may perform a second random access procedure using a second RACH configuration of the plurality of RACH configurations. One of the first and second random access procedures may be performed via a non-SUL carrier of a cell, and the other one of the first and second random access procedures may be performed via an SUL carrier of the cell. The first RACH configuration may be the same to the second RACH configuration (e.g., a wireless device may select the same RACH configuration for a second attempt of a random access procedure among a plurality of RACH configurations). The first RACH configuration may be different from the second RACH configuration (e.g., a wireless device may select a different RACH configuration for a second attempt of a random access procedure among a plurality of RACH configurations). One of the first and second RACH configurations may be a RACH configuration for a contention-free random access and the other one of the first and second RACH configurations may be a RACH configuration for a contention-based random access. The first and second RACH configurations may be a RACH configuration for a contention-free random access or a contention-based random access.

A wireless device may select a first carrier (e.g., an SUL carrier or a non-SUL carrier) for a first random access (e.g., a contention-free random access), for example, if a base station transmits, to the wireless device, at least two RACH configurations (e.g., one for the SUL carrier and the other for the non-SUL carrier for a handover or an SCell addition). The wireless device may start a second random access via a second carrier for example, based on (e.g., after or in response to) determining a failure of the first random access. The second carrier may be different from or same to the first carrier.

There may be one or more ways for a base station and/or a wireless device to determine a UL carrier for each attempt of a random access procedure, for example, if a plurality of RACH configurations with a plurality of UL carriers are provided to the wireless device. A base station may indicate which carrier has a higher priority over the other. The base station may indicate the priority between a non-SUL carrier and an SUL carrier, for example, by transmitting an indicator associated with a plurality of RACH configurations. An order of RACH configurations in the plurality of RACH configurations may indicate a priority. For example, the plurality of RACH configurations may be sorted in a list according to the priority (e.g., the RACH configurations may be arranged from the highest priority to the lowest priority). A wireless device may select a first carrier associated with a first RACH configuration to initiate a first random access procedure, for example, if the first RACH configuration is the first item in the list. If the first random access procedure on the first carrier is unsuccessful, the wireless device may select a second carrier associated with a second RACH configuration from the list. The second RACH configuration may have the second highest priority and may be the second item in the list. If the second random access procedure on the second carrier is unsuccessful, the wireless device may select a third carrier associated with a third RACH configuration from the list (e.g., the third RACH configuration may be the third item in the list). The list may comprise RACH configurations respectively associated with a plurality of SUL carriers (e.g., a RACH configuration associated with a first SUL carrier, a RACH configuration associated with a second SUL carrier, etc.) and RACH configurations respectively associated with a plurality of non-SUL carriers (e.g., a RACH configuration associated with a first non-SUL carrier, a RACH configuration associated with a second non-SUL carrier, etc.). The priority among a plurality of carriers may be predefined. For example, based on the predefined priority, a wireless device may first select an SUL carrier for a first random access procedure and may select a non-SUL carrier, for example, if the first random access procedure was unsuccessful. A wireless device may first select a non-SUL carrier for a first random access procedure before selecting an SUL carrier, for example, if the non-SUL carrier is prioritized over the SUL carrier and if the wireless device is located in a coverage of the non-SUL carrier. A wireless device may randomly select a carrier between a non-SUL and an SUL carrier and may start a random access (e.g., a contention-free random access for a handover and/or an SCell addition) based on a RACH configuration associated with the selected carrier.

A wireless device may select a carrier based on a DL measurement (e.g., a measurement on a DL carrier). A wireless device may select a non-SUL carrier for a first random access (e.g., a contention-free random access for a handover and/or an SCell addition), for example, if a value of RSRP in a DL measurement is higher than a broadcast threshold (e.g. sul-RSRP-Threshold configured by an RRC). If a first random access is unsuccessful, a wireless device may perform a UL carrier selection based on a DL measurement (e.g., RSRP of DL reference signals measured by the wireless device). Based on the DL measurement, a wireless device may reselect the previously selected UL carrier or may select a UL carrier different from the previously selected UL carrier.

Providing one or more RACH configurations (e.g., per carrier) and performing one or more random access procedures based on the one or more RACH configurations may be beneficial (e.g., by reducing the likelihood of a long delay before gaining another opportunity for a random access). For a handover, if a base station transmits, to a wireless device, RACH configurations for a plurality of (e.g., contention-free) random access opportunities, the wireless device may (re)attempt a (e.g., contention-free) random access procedures via a plurality of carriers (e.g., non-SUL carrier(s) and SUL carrier(s)), for example, based on (e.g., after or in response to) a failure of at least one random access procedure instead of starting a contention-based random access. The plurality of random access opportunities may prevent or reduce a call drop event. For an SCell addition, if a base station transmits, to a wireless device, RACH configurations for a plurality of contention-free random access opportunities, the wireless device may (re)attempt one or more contention-free random accesses, for example, after or in response to a failure of at least one random access procedure, instead of waiting for a control message (e.g., a PDCCH order initiating another random access) to be transmitted by the base station for another opportunity for a random access. This may prevent or reduce the likelihood of a prolonged random access delay and/or a degraded user experience. A fast-moving wireless device may move out of the non-SUL coverage 1610 and/or the SUL coverage 1620, instead of remaining in the non-SUL coverage 1610 and/or the SUL coverage 1620 for a long time. The short presence in the non-SUL coverage 1610 and/or the SUL coverage 1620 by the fast-moving wireless device may not allow enough time to wait for the control message from the base station. For a handover and/or an SCell addition for a fast-moving wireless device that travels from a first carrier (e.g., an SUL or a non-SUL) coverage of a cell to a second carrier (e.g., a non-SUL or an SUL) of the cell, a plurality of (e.g., contention-free) random access opportunities via the first carrier and the second carrier may be beneficial. One or more random access opportunities may prevent or reduce the likelihood of triggering a radio link failure, for example, after or in response to a failure of one random access procedure on the first carrier. The wireless device may not trigger the radio link failure after the failure of one random access procedure on the first carrier but may initiate another random access procedure on the second carrier, for example, if a RACH configuration on the second carrier is available. A load balancing for the base station may be achieved, for example, if uplink traffic is distributed to a plurality of uplink carriers. The load balancing may be more beneficial, for example, if a carrier suffers from high RACH requests from many wireless devices).

Figure 17:
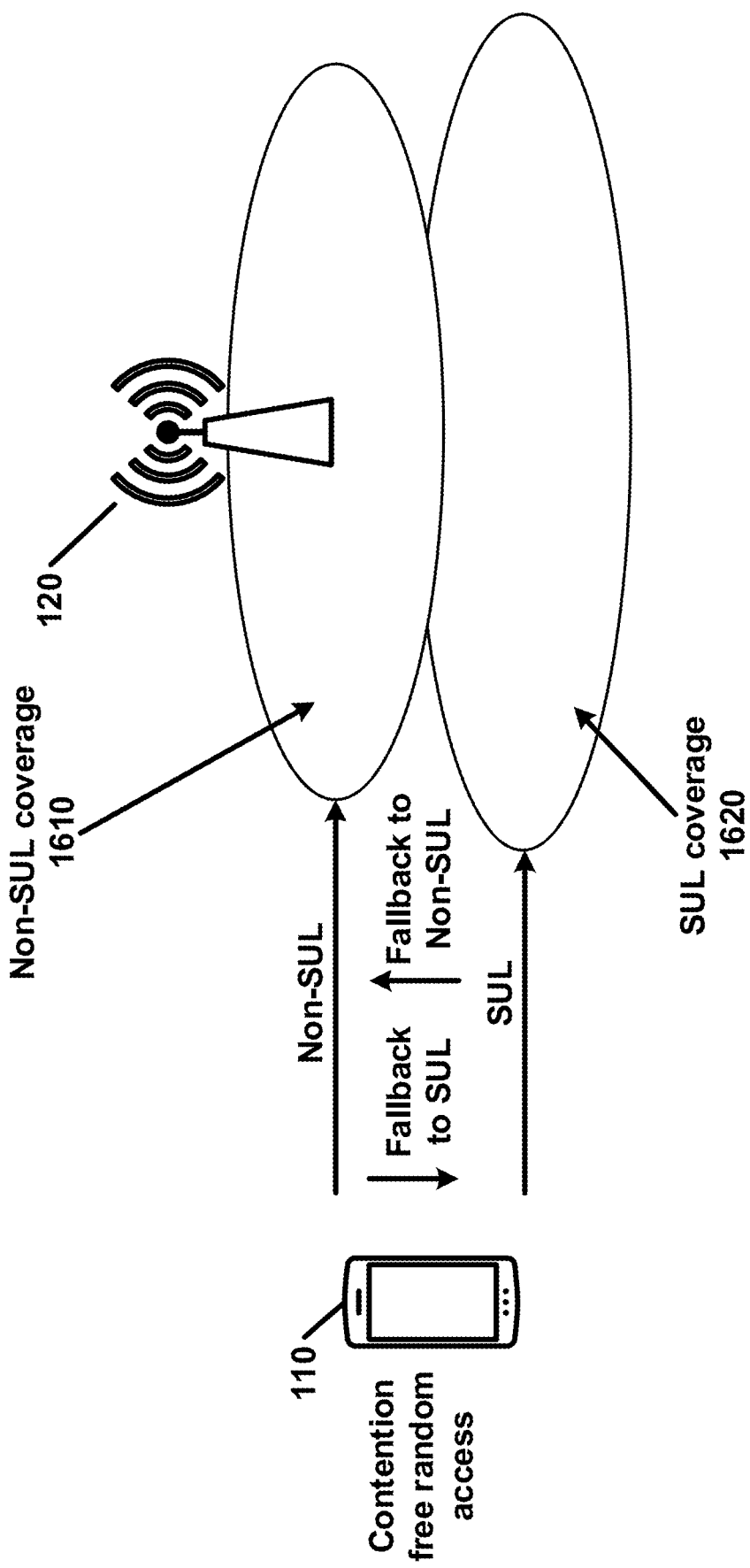
FIG. 17 shows an example random access.

FIG. 17 shows an example of a random access fallback among a plurality of UL carriers of a cell (e.g., between a first UL carrier of a cell and a second UL carrier of the cell). A wireless device 110 may receive, from a serving base station 120 (e.g., a serving base station for an SCell addition, a source or target base station for a handover, etc.), a control message (e.g., an RRC message initiating a handover, a PDCCH order, etc.) comprising one or more parameters indicating a first RACH configuration for a first UL carrier (e.g., an SUL or a non-SUL) of a cell and a second RACH configuration for a second UL carrier (e.g., a non-SUL or an SUL) of the cell for a random access to the cell. The wireless device may initiate a first (e.g., contention-free) random access procedure based on a first RACH configuration via a first UL carrier. The wireless device may fallback from the first UL carrier to a second UL carrier to initiate a second random access procedure, for example, after or in response to a failure of the first random access procedure. The wireless device may initiate the second (e.g., contention-free) random access based on a second RACH configuration via the second UL carrier. A carrier selection order may be predefined (e.g., an SUL carrier may have a higher priority over a non-SUL carrier or vice versa). A UL carrier selection order may be indicated, for example, via an indicator in a control message (e.g., an RRC message initiating a handover and/or a PDCCH order for an SCell addition) transmitted by a base station for the random access procedures.

A base station may send (e.g., transmit), to a wireless device, an RRC message (e.g., for a handover) or a PDCCH order (e.g., for an SCell addition). The RRC message or the PDCCH order may comprise a plurality of RACH configurations for initiating the random access procedures. A wireless device may select a first RACH configuration of the plurality of RACH configurations for a (contention-free or contention-based) random access. The wireless device may start a contention-free random access, for example, if the first RACH configuration comprises at least one dedicated preamble index. The wireless device may start a contention-based random access, for example, if the first RACH configuration does not comprise at least one dedicated preamble index. A wireless device may send (e.g., transmit) a random access preamble indicated by the first RACH configuration one or more times until the number of the random access preamble transmissions exceed a threshold number (e.g., ra-PreambleTx-Max configured by an RRC message). If the wireless device receives no RAR corresponding to the one or more preamble transmissions, the wireless device may start a random access based on a second RACH configuration of the plurality of RACH configurations. The wireless device may start a contention-free random access, for example, if the second RACH configuration comprises at least one dedicated preamble index. The wireless device may start a contention-based random access, for example, if the second RACH configuration does not comprise at least one dedicated preamble index.

The number of random access attempts that may be performed by a wireless device may depend on the number of RACH configurations in a plurality of RACH configurations transmitted by a base station. A RACH configuration may be configured per uplink carrier. A base station may transmit, to a wireless device, two RACH configurations (e.g., one for an SUL carrier and the other for a non-SUL carrier) for a random access to the cell, for example, if the cell is configured with the SUL carrier and the non-SUL carrier.

A base station may transmit a first RACH configuration for an SUL carrier and a second RACH configuration for a non-SUL carrier. A wireless device may select one of the first and second RACH configurations for a first random access procedure, for example, based on a random selection, predefined and/or indicated priority, and/or DL measurements. If the first random access procedure is unsuccessful, the wireless device may start a second random access procedure based on a RACH configuration selected from the first and second RACH configurations, for example, based on a random selection, predefined and/or indicated priority, and/or DL measurements. A wireless device may select one of the plurality of RACH configurations based on one or more criteria. The one or more criteria may comprise RSRP value(s) of DL pathloss reference(s).

A network (e.g., an NG-RAN) may control a wireless device mobility (e.g., for a wireless device in RRC_CONNECTED mode). The network may determine if (and/or when) a wireless device connects to particular cell(s) (e.g., to an intra-RAT cell and/or to an inter-RAT cell). For a network-controlled mobility in RRC_CONNECTED, a PCell may be changed based on an RRC connection reconfiguration message comprising mobility control information (e.g., mobilityControlInfo for a handover). One or more SCell(s) may be changed using one or more RRC connection reconfiguration messages (e.g., with or without mobility control information). A network may trigger a handover procedure, for example, based on one or more measurements on one or more DL reference signals, load, QoS, wireless device category (and/or capability), and/or other parameters. A network may configure a wireless device to perform measurement reporting, which may comprise an indication or configuration of measurement gaps. A network may initiate a handover blindly, for example, without having measurement reports from a wireless device.

A wireless device within a coverage of a source base station may have information regarding roaming/handover restrictions. The roaming/handover restrictions may comprise one or more roaming restrictions and/or one or more handover restrictions. The roaming and/or handover restrictions may be provided to the wireless device either at a connection establishment or at the last tracking area update process. The source base station may configure the wireless device with measurement procedures using at least one RRC connection reconfiguration message. The wireless device may be triggered to transmit at least one measurement report by one or more configurations set by, for example, system information, an RRC configuration, etc. A source base station may determine a handover based on one or more parameters (e.g., the at least one measurement report, RRM information, traffic load, or a combination thereof). A source base station may initiate a handover procedure by transmitting a handover request message to one or more potential target base stations. A source base station may start a handover preparation timer, for example, if the source base station transmits a handover request message. Upon reception of a handover request acknowledgement message from a target base station, the source base station may stop the handover preparation timer.

The source base station may prepare a list of one or more target cells. The one or more target cells may comprise a PCell. The source base station may provide a target base station with a list of one or more cells (e.g., per frequency and/or per carrier) for which measurement information (e.g., RSRP, RSRQ, or a combination thereof) is available. The one or more cells may be listed in order of decreasing or increasing RSRP (or RSRQ, or a combination thereof)

measured by one or more DL reference signals configured for the one or more cells. The source base station may provide the target base station with the measurement information for one or more cells provided in the list. The target base station may determine which cell(s) are configured for the wireless device. The configured cell(s) may comprise one or more cells not indicated in the list provided by the source base station. The target base station may determine which uplink carrier(s) (e.g., between non-SUL carrier(s) and SUL carrier(s)) are configured for the wireless device, for example, if selected cell(s) are configured with SUL carrier(s). The target base station may select non-SUL carrier(s) and SUL carrier(s) of a target cell of the target base station so that the wireless device may perform a (e.g., contention-free) random access via the non-SUL carrier(s) and/or SUL carrier(s) for a handover.

A target base station may generate at least one handover message (or handover information) to configure a handover for a wireless device. The at least one handover message (or handover information) may comprise an access stratum configuration to be used in target cell(s). A source base station may receive at least one handover message from a target base station and may forward it to a wireless device. The source base station may forward (e.g., transparently) the at least one handover message without, or with, altering values and/or content. The source base station may initiate data forwarding for one or more radio bearers (e.g., dedicated radio bearers) or for a subset of the one or more radio bearers.

At least one handover message (or handover information) may comprise at least one of an uplink configuration, a downlink configuration, and/or one or more RACH configurations. A wireless device may perform, based on the at least one handover message (or handover information), a (e.g., contention-free) random access for a handover to a target base station. The downlink configuration may comprise one or more parameters indicating one or more RS configurations associated with an SS/PBCH and/or a CSI-RS. The uplink configuration may comprise one or more parameters indicating at least one of PUSCH configuration(s), PUCCH configuration(s), non-SUL configuration(s), and/or SUL configuration(s). The one or more RACH configurations may comprise one or more parameters indicating at least one of: one or more preamble indices, one or more frequency offset of one or more PRACH resources, one or more mask indices of one or more PRACH resources, one or more BWP indices associated with one or more PRACH resources, and/or one or more SUL indicators.

A target base station may provide a wireless device (e.g., via a source base station) with a plurality of dedicated RACH configurations. The wireless device may perform, based on the plurality of dedicated RACH configurations, a (e.g., contention-free) random access for a handover to the target base station. The plurality of dedicated RACH configurations may comprise at least one of dedicated RACH configuration configured on non-SUL carrier(s) and/or dedicated RACH configuration configured on SUL carrier(s). A dedicated RACH configuration may comprise an SUL indicator (e.g., 1 bit field). A wireless device may identify whether the dedicated RACH configuration is associated with an SUL or a non-SUL carrier, for example, based on the SUL indicator.

If a wireless device receives at least one handover message (or handover information), the wireless device may identify one or more RACH configurations from the at least one handover message and/or the wireless device may attempt a (e.g., contention-free) random access to a target cell, via one or more RACH occasions, based on the one or more RACH configurations. The at least one handover message (or handover information) may comprise a plurality of RACH configurations. A wireless device may receive one or more RACH configurations per carrier of a cell. If a cell is configured with SUL and non-SUL carriers, a wireless device may receive a RACH configuration per uplink carrier. Based on one or more RACH configurations (e.g., configured per carrier), a wireless device may attempt one or more (e.g., contention-free) random accesses to a target base station. A network may ensure one or more dedicated preambles to be available for transmission during one or more RACH occasions, for example, if the one or more dedicated preambles are allocated for a (e.g., contention-free) random access to a target cell. Upon successful completion of the handover, the wireless device may transmit a message to confirm a successful completion of a handover to the target base station.

A target base station may be unable to comprehend a wireless device configuration provided by a source base station, for example, if the target base station does not support one or more protocols (e.g., RRC protocols) that the source base station uses to configure the wireless device and/or if the target base station does not support to release the one or more protocols. The target base station may use a full configuration option to reconfigure the wireless device for a handover and a re-establishment of an RRC connection, for example, if the target base station is unable to comprehend the wireless device configuration. The full configuration option may comprise an initialization of a radio configuration that may make a procedure independent of a configuration used (e.g., by the source base station) in source cell(s) with an exception that security algorithms may be used (e.g., continuously used) for an RRC re-establishment.

PDCP SDUs may be (re-)transmitted in target cell(s), for example, after a successful completion of a handover. This may be used for dedicated radio bearers using RLC-AM mode and/or for handovers not involving the full configuration option. A sequence number (SN) and/or a hyper frame number (HFN) may be reset for one or more radio bearers, for example, after a successful completion of a handover not involving the full configuration option. For dedicated radio bearers using RLC-AM mode, SN and/or HFN may continue without a reset. For reconfigurations involving the full configuration option, for example, PDCP entities may be newly established (e.g., SN and HFN may not continue) for dedicated radio bearers irrespective of the RLC mode. A wireless device behavior during a handover may be the same regardless of handover procedures used within a network (e.g., regardless of whether the handover procedures comprise X2 or S1 signaling procedures).

A source base station may maintain context information (e.g., that may indicate connection information associated with a source base station, user identities, mobility state, user security parameters, and/or etc.) to enable a wireless device to return to the previous connection, for example, if a handover failure occurs. If a handover has failed (e.g., one or more random accesses performed based on one or more RACH configurations are unsuccessful), a wireless device may attempt to resume an RRC connection to a source cell (e.g., PCell) of the source base station and/or to a cell using an RRC re-establishment procedure. This connection resumption may be successful, for example, if the accessed cell is prepared (e.g., if the accessed cell is a cell of a source base station or of a base station towards which the handover preparation has been performed). The cell in which a reestablishment procedure is successful may become a PCell, and one or more SCells, if configured, may be released.

For an X2 handover process, a source base station may transmit a handover request message to one or more potential target base stations. The handover request message may comprise information for preparing the handover at the target side (e.g., one or more potential target base stations and/or one or more target AMFs). For an S1 handover process without AMF (or MME) relocation, a source base station may transmit a handover required message to an AMF for one or more potential target base stations, and the AMF may transmit a handover request message to the one or more potential target base stations. The handover required message and/or the handover request message may deliver information for preparing a handover at the target side. For an S1 handover process relocating an AMF, a source base station may transmit a handover required message to a source node (e.g., a source AMF) for one or more potential target base stations. The source node (e.g., a source AMF) may transmit a forward relocation request message to one or more potential target nodes (e.g., target AMFs) serving one or more potential target base stations, and the one or more potential target nodes may transmit a handover request message to the one or more potential target base stations. A handover required message, a forward relocation request message, and/or the handover request message may deliver information for preparing a handover at the target side.

A handover admission control may be performed by a target base station, for example, based on one or more factors (e.g., QoS required for wireless device bearers, wireless device capabilities, wireless device configuration, target base station load, or a combination thereof). A target base station may configure required resources according to information received from a source base station and may reserve a C-RNTI and/or at least one RACH preamble. An access stratum configuration to be used in a target cell may be specified independently (e.g., as an establishment) or as a delta compared to the access stratum configuration used in a source cell (e.g., as a reconfiguration).

A target base station may prepare a handover with L1/L2 and may transmit a handover request acknowledge message to a source base station. A handover request acknowledge message may comprise a transparent container to be transmitted to a wireless device as an RRC message to perform a handover, such as in an X2 handover procedure. A handover request acknowledge message from a target base station to an AMF and/or a handover command message from an AMF to a source base station may comprise a transparent container to be transmitted to a wireless device as an RRC message to perform a handover, such as in an S1 handover procedure without an AMF relocation. A handover request acknowledge message from a target base station to a target AMF, a forward relocation response message from a target AMF to a source AMF, and/or a handover command message from a source AMF to a source base station may comprise a transparent container to be transmitted to a wireless device as an RRC message to perform a handover, such as in an S1 handover procedure relocating an AMF. A transparent container may comprise at least one of a C-RNTI, target base station security algorithm identifiers for selected security algorithms, at least one dedicated RACH preamble, access parameters, SIBs, and/or other configuration parameters. A target base station may generate the RRC message to perform a handover (e.g., an RRC connection reconfiguration message comprising mobility control information). An RRC message may be transmitted by a source base station to a wireless device.

A transparent container transmitted to a wireless device as an RRC message to perform a handover may comprise one or more RACH configurations of a target cell. The one or more RACH configurations may comprise at least one RACH configuration for a non-SUL carrier of the target cell and at least one RACH configuration for an SUL carrier of the target cell, for example, if the target cell is configured with an SUL carrier and a non-SUL carrier. A RACH configuration may comprise parameters indicating at least one of a dedicated RACH preamble and/or a PRACH mask index. A RACH configuration for a non-SUL carrier and a RACH configuration for an SUL carrier may have a same or different dedicated RACH preamble and/or a same or different PRACH mask index. A RACH configuration may be for a contention-based random access, for example, if the RACH configuration does not comprise a dedicated RACH preamble.

A source base station may perform a necessary integrity protection and ciphering of a message. A wireless device may receive an RRC connection reconfiguration message from the source base station and may start a handover procedure. A wireless device may not need to delay a handover execution for delivering HARQ/ARQ responses to a source base station.

A wireless device may perform synchronization to a target base station and may access a target cell via a (e.g., contention-free) random access procedure on a cell (e.g., a primary cell), for example, after receiving an RRC connection reconfiguration message comprising mobility control information. A wireless device may perform a contention-free random access procedure, for example, if mobility control information comprises at least one parameter indicating at least one dedicated RACH preamble. A wireless device may perform a contention-based procedure, for example, if no dedicated preamble is indicated. A wireless device may derive target base station-specific keys and may configure selected security algorithms to be used in a target cell. A target base station may respond with an uplink allocation and a timing advance, for example, after or in response to receiving at least one preamble from a wireless device performing a handover based on mobility control information transmitted by the target base station.

The wireless device may transmit an RRC connection reconfiguration complete message (e.g., C-RNTI) to confirm a handover and to indicate that a handover procedure has been completed for the wireless device, for example, after the wireless device successfully accessed the target cell. A wireless device may transmit a MAC uplink buffer status report (BSR) control element (CE) along with an uplink RRC connection reconfiguration complete message. The wireless device may transmit a MAC uplink BSR CE (e.g., whenever possible) to a target base station, for example, if the uplink RRC connection reconfiguration complete message is not transmitted. A target base station may verify a C-RNTI transmitted in an RRC connection reconfiguration complete message. A target base station may begin a data transmission to a wireless device and a data reception from the wireless device.

A wireless device may receive, from a base station, one or more messages initiating a handover procedure to a cell of a second base station. The one or more messages comprising parameters indicating: first random-access channel (RACH) parameters and second RACH parameters. The wireless device may initiate a first RA procedure via a first uplink carrier of the first cell based on the first RACH parameters. The wireless device may complete the first RA procedure, for example, if the wireless device receives at least one corresponding RAR during the first RA procedure. The wireless device may initiate a second RA procedure via a second uplink carrier of the first cell based on the second RACH parameters, for example, if the wireless device receives no corresponding RAR (e.g., an RAR corresponding to one or more random access preamble transmitted by the wireless device) during the first RA procedure. The first RACH parameters may indicate one or more of: the first uplink carrier; a first BWP of the first carrier; at least one first RACH resource associated with the first BWP; and/or at least one first preamble. The second RACH parameters may indicate one or more of: the second uplink carrier; a second BWP of the second carrier; at least one second RACH resource associated with the second BWP; and/or at least one second preamble. The first RA procedure may comprise transmitting, by the wireless device, the at least one first preamble; and repeating, until at least one RAR is detected or a number of transmissions of the at least one first preamble exceeds a first value; monitoring a control channel for the at least one RAR during an RAR monitoring window; and transmitting the at least one first preamble based on determining that the at least one RAR has not been detected during the RAR monitoring window. The first value may be semi-statically configured by RRC signaling. The RAR monitoring window may start, for example, after or in response to transmitting at least one first preamble. The size of the RAR monitoring window may be semi-statically configured by RRC signaling.

Figure 18:
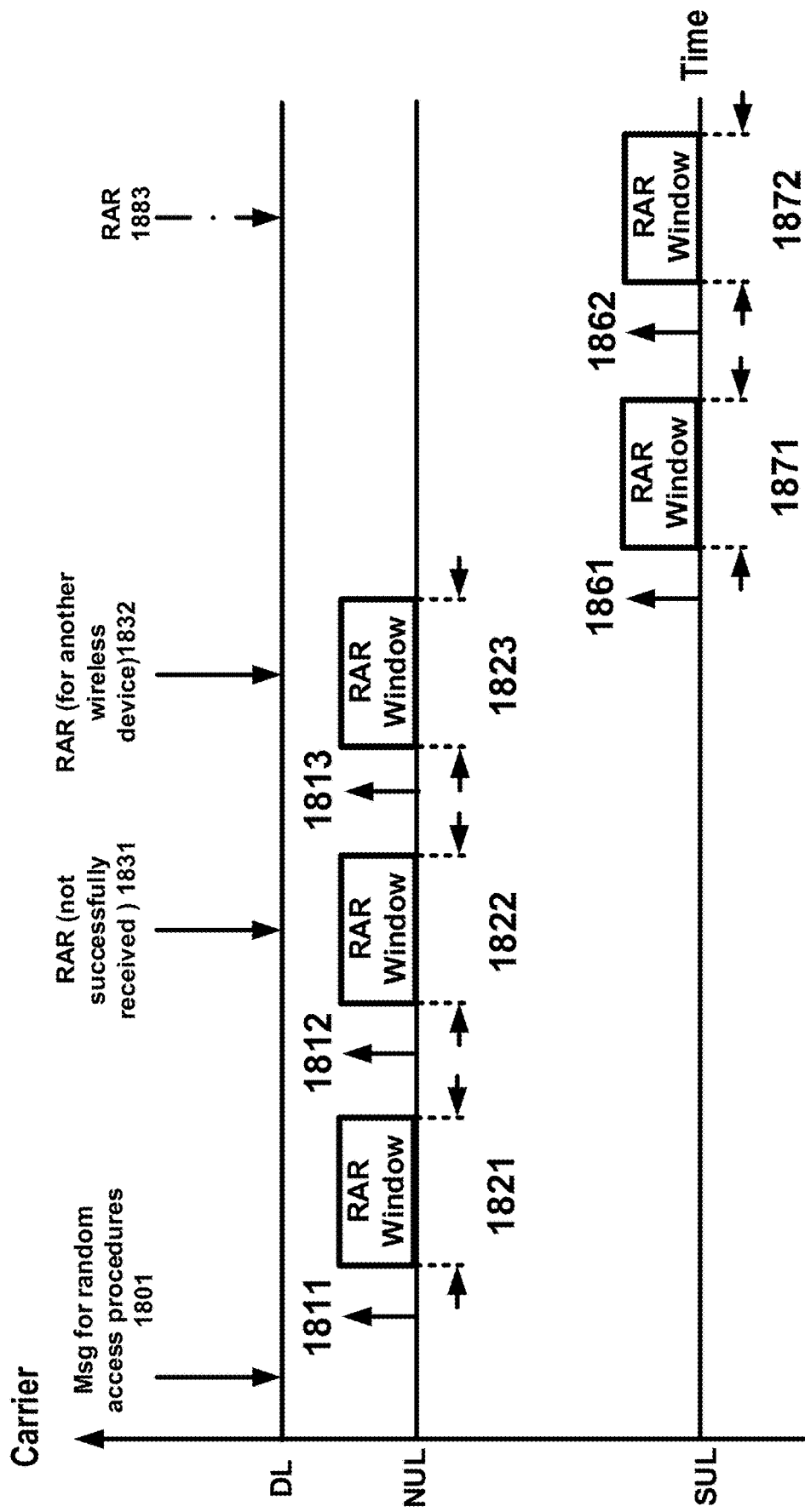
FIG. 18 shows an example of random access procedures using more than one uplink carriers of a cell.

FIG. 18 shows an example of random access procedures using more than one uplink carriers of a cell. For a handover, the cell may be a target cell of a target base station. For an SCell addition, the cell may be an SCell of a serving base station. The cell may comprise a DL carrier and an NUL carrier. The cell may optionally configure an SUL carrier for one or more wireless devices. For an FDD mode, the DL carrier and the NUL carrier may have different frequency resources (e.g., different subcarriers) as shown in FIG. 18. The Y-axis of FIG. 18 may indicate different frequency resources (e.g., DL carrier, the NUL carrier, and the SUL carrier each use different frequency resources). The X-axis of FIG. 18 may indicate different time resources.

A base station (e.g., a source base station) may send, to a wireless device, a message 1801 (e.g., one or more messages) for random access procedures. The message 1801 may comprise an RRC message for a handover or a PDCCH order for an SCell addition. The message 1801 may comprise configuration information for a plurality of random access procedures. The plurality of random access procedures may be associated with different uplink carriers (e.g., the NUL and the SUL). For example, the wireless device may retrieve configuration information for a first random access procedure associated with the NUL carrier and configuration information for a second random access procedure associated with the SUL carrier. The configuration information may comprise an SUL indicator described above. The configuration information may indicate the priority between the NUL carrier and the SUL carrier. The configuration information may not indicate the priority between the NUL carrier and the SUL carrier. The wireless device may determine to perform the first random access procedure via the NUL carrier. The maximum number (e.g., three times) of allowed random access preamble transmissions (e.g., allowed random access attempts) for the first random access procedure may be indicated by the message 1801 for a handover. For an SCell addition, the maximum number (e.g., three times) of allowed random access preamble transmissions (e.g., allowed random access attempts) for the first random access procedure may be semi-statically configured (e.g., by a broadcast message) before receiving the message 1801 (e.g., a PDCCH order).

FIG. 18 shows an example that a wireless device selects an NUL as an uplink carrier to perform a first random access procedure. The wireless device may select an uplink carrier based on one or more ways (e.g., predefined order-based, priority-based, random selection-based, DL measurement-based, etc.) described elsewhere in this specification. The first random access procedure via the NUL carrier may comprise one or more random access attempts. The wireless device may send, via the NUL carrier, a random access preamble 1811 and may monitor for an RAR responsive to the random access preamble 1811. The monitoring may be performed during an RAR window 1821. The wireless device may not receive an RAR during the RAR window 1821, and may determine that the first random access attempt for the first random access procedure is unsuccessful. The wireless device may prepare and send, via the NUL carrier, a random access preamble 1812 and may monitor for an RAR responsive to the random access preamble 1812. The monitoring may be performed during an RAR window 1822. A base station may send, to the wireless device and via the DL carrier, an RAR 1831 during the RAR window 1822. However, the wireless device may not successfully receive the RAR 1831 or may not successfully decode the RAR 1831. The wireless device may determine that the second random access attempt for the first random access procedure is unsuccessful. The wireless device may prepare and send, via the NUL carrier, a random access preamble 1813 and may monitor for an RAR responsive to the random access preamble 1813. The monitoring may be performed during an RAR window 1823. A base station may send, to other wireless device(s) and via the DL carrier, an RAR 1832 during the RAR window 1823. The wireless device may receive the RAR 1832 and determine that the RAR 1832 is for other wireless device(s) (e.g., by detecting, from the RAR 1832, one or more preamble identifiers not matched to a preamble transmitted by the wireless device). The wireless device may determine that the third random access attempt for the first random access procedure is unsuccessful. The wireless device may determine that the first random access procedure is unsuccessful, for example, if the number of failed random access attempts for the first random access procedure satisfy a threshold (e.g., the maximum number of allowed random access preamble transmission for the first random access procedure).

The NUL carrier may be in a high frequency band (e.g., greater than 6 GHz) and may have small coverage. The wireless device may unsuccessfully perform a handover or an SCell addition by the failure of the first random access procedure. The wireless device may perform a second random access procedure based on the configuration information of the message 1801, for example, after the failure of the first random access procedure. The subsequent second random access procedure may allow the wireless device to perform one or more random access attempts via the SUL carrier without a long wait for another random access opportunity. The wireless device may perform the subsequent second random access procedure on an NUL carrier or an SUL carrier based on a UL carrier selection mechanism (e.g., predefined order-based, priority-based, random selection-based, DL measurement-based, etc.). FIG. 18 shows an example that the wireless device selects an SUL carrier for the subsequent second random access procedure.

The second random access procedure via the SUL carrier may comprise one or more random access attempts. After the RAR window 1823 expires, the wireless device may send, via the SUL carrier, a random access preamble 1861 and may monitor for an RAR responsive to the random access preamble 1861. The monitoring may be performed during an RAR window 1871. The wireless device may not receive an RAR during the RAR window 1871, and may determine that the first random access attempt for the second random access procedure is unsuccessful. The wireless device may prepare and send, via the SUL carrier, a random access preamble 1862 and may monitor for an RAR responsive to the RAR 1862. The monitoring may be performed during an RAR window 1872. A base station may send, to the wireless device and via the DL carrier, an RAR 1883 during the RAR window 1872. The wireless device may successfully receive the RAR 1883 and may send an uplink message (not shown) responsive to the RAR 1883.

The SUL carrier may have a low frequency (e.g., 1.7 GHz band and/or the like), and the coverage of the SUL carrier may be larger than the coverage of the NUL carrier. The SUL carrier may be a more desirable resource than the NUL carrier, and many wireless devices may perform a reliable communication via the SUL carrier. A base station may efficiently allocate resources of the SUL carrier to different wireless devices such that the SUL carrier is not overly crowded with too many wireless devices. FIG. 18 shows that for a random access purpose, the SUL carrier may be used, for example, after the first random access procedure via the NUL carrier is unsuccessful. The resources of the SUL carrier may be efficiently allocated to one or more wireless devices having connection problems with the NUL carrier.

The wireless device may prepare and/or send the random access preamble 1861, for example, before the RAR window 1823 expires. The wireless device may send the random access preamble 1861 as the RAR window 1823 expires, and the random access attempt by the random access preamble 1861 may be performed without a significant delay, for example, after sending the random access preamble 1813.

Figure 19:
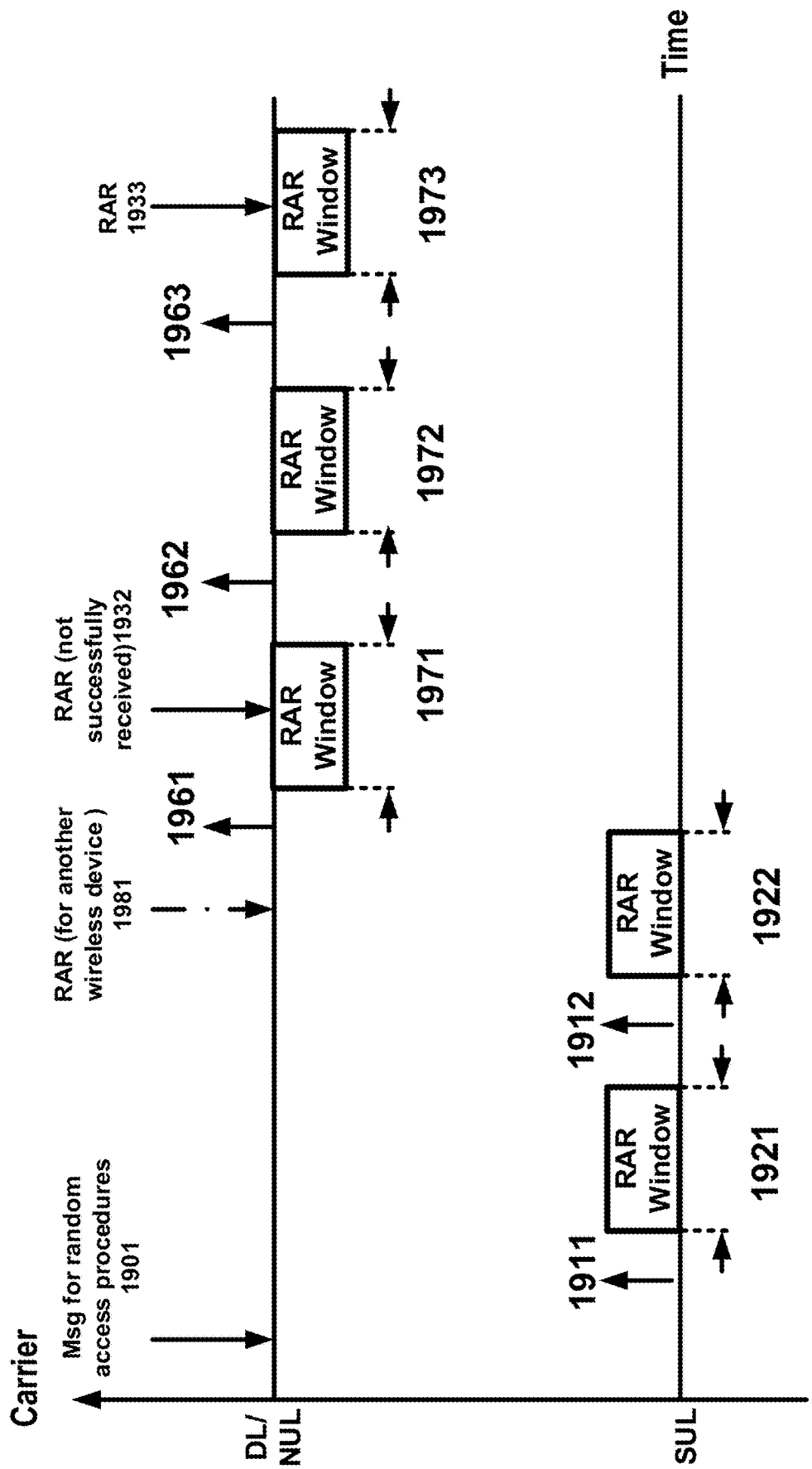
FIG. 19 shows an example of random access procedures using more than one uplink carriers of a cell.

FIG. 19 shows an example of random access procedures using more than one uplink carriers of a cell. The SUL carrier may be prioritized over the DL/NUL carrier, for example, if UL resources of the DL/NUL carrier are limited (e.g., some TDD configurations may have fewer UL resources). The cell may comprise a carrier that can be used both for downlink and uplink (DL/NUL carrier), and may optionally configure an SUL carrier for one or more wireless devices. For a TDD mode, the DL carrier and the NUL carrier may be the same carrier and use the same frequency resources (e.g., same subcarriers) as shown in FIG. 19 but may use different time resources (e.g., different subframes, slots, and/or mini-slots, etc.). The Y-axis of FIG. 19 may indicate different frequency resources (e.g., the DL/NUL carrier and the SUL carrier use different frequency resources). The X-axis of FIG. 19 may indicate different time resources.

A base station (e.g., a source base station) may send, to a wireless device, a message 1901 for random access procedures. The message 1901 may be similar to the message 1801 (e.g., it may comprise an RRC message for a handover or a PDCCH order for an SCell addition). The message 1901 may comprise configuration information for a plurality of random access procedures. The plurality of random access procedures may be associated with different uplink carriers (e.g., the NUL and the SUL). The wireless device may retrieve configuration information for a first random access procedure via the SUL carrier and configuration information for a second random access procedure via the one or more uplink resources of the DL/NUL carrier. The wireless device may determine to perform the first random access procedure via the SUL carrier. The maximum number (e.g., two times) of allowed random access preamble transmissions (e.g., allowed random access attempts) for the first random access procedure may be indicated by the message 1901.

The first random access procedure via the SUL carrier may comprise one or more random access attempts. The wireless device may send, via the SUL carrier, a random access preamble 1911 and may monitor for an RAR responsive to the random access preamble 1911. The monitoring may be performed during an RAR window 1921. The wireless device may not receive an RAR during the RAR window 1921, and may determine that the first random access attempt for the first random access procedure is unsuccessful. The wireless device may prepare and send, via the SUL carrier, a random access preamble 1912 and may monitor for an RAR responsive to the random access preamble 1912. The monitoring may be performed during an RAR window 1922. A base station may send, to another wireless device and via one or more DL resources of the DL/NUL carrier, an RAR 1981 during the RAR window 1922. The wireless device may receive the RAR 1981 and determine that the RAR 1981 is for another wireless device (e.g., by detecting, from the RAR 1981, an identifier associated with another wireless device). The wireless device may determine that the second random access attempt for the first random access procedure is unsuccessful. The wireless device may determine that the first random access procedure is unsuccessful, for example, if the allowed random access attempts for the first random access procedure have been unsuccessful.

The wireless device may perform the second random access procedure via one or more uplink resources of the DL/NUL carrier, for example, after the first random access procedure. The second random access procedure via one or more uplink resources of the DL/NUL carrier may comprise one or more random access attempts. The wireless device may send, via one or more uplink resources of the DL/NUL carrier, a random access preamble 1961 and may monitor for an RAR responsive to the random access preamble 1961. A base station may send, to the wireless device and via one or more downlink resources of the DL/NUL carrier, an RAR 1932 during an RAR window 1971. However, the wireless device may not successfully receive the RAR 1932 or may not successfully decode the RAR 1932. The wireless device may determine that the first random access attempt for the second random access procedure is unsuccessful. The wireless device may prepare and send, via one or more uplink resources of the DL/NUL carrier, a random access preamble 1962 and may monitor for an RAR responsive to the random access preamble 1962. The monitoring may be performed during an RAR window 1972. The wireless device may not receive an RAR during the RAR window 1972, and may determine that the second random access attempt for the second random access procedure is unsuccessful. The wireless device may prepare and send, via one or more uplink resources of the DL/NUL carrier, a random access preamble 1963 and may monitor for an RAR responsive to the random access preamble 1963. The monitoring may be performed during an RAR window 1973. The wireless device may receive an RAR 1933 during the RAR window 1973. The wireless device may determine, based on the RAR 1933, that the third random access attempt for the second random access procedure is successful. After the successful random access, the wireless device may perform one or more uplink transmissions, to a base station, via one or more uplink resources of the DL/NUL carrier and/or the SUL carrier.

A wireless device may prepare a random access attempt via a first uplink carrier after sending a random access preamble via a second uplink carrier. The random access procedures for different uplink carriers may at least partially overlap, and speed, accuracy, and/or efficiency for random access procedures may be improved.

Figure 20:
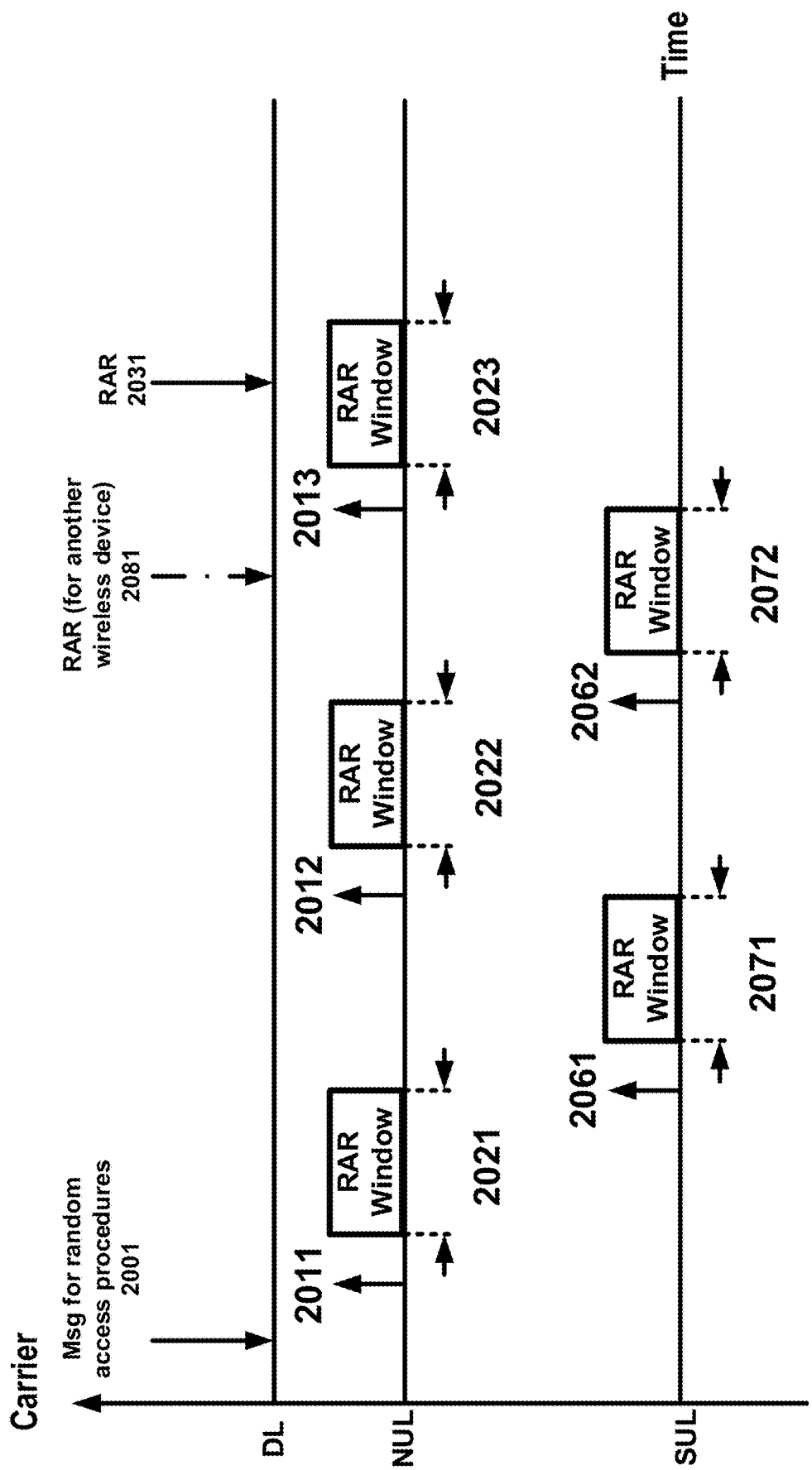
FIG. 20 shows an example of random access procedures using more than one uplink carriers of a cell.

FIG. 20 shows an example of random access procedures using more than one uplink carriers of a cell. The cell may comprise a DL carrier and an NUL carrier, and may optionally configure an SUL carrier for one or more wireless devices. For an FDD mode, the DL carrier and the NUL carrier may have different frequency resources (e.g., different subcarriers) as shown in FIG. 20. The Y-axis of FIG. 20 may indicate different frequency resources (e.g., DL carrier, the NUL carrier, and the SUL carrier each use different frequency resources). The X-axis of FIG. 20 may indicate different time resources. However, for TDD case, the DL carrier and the NUL carrier may use the same frequency resources but use different time resources as described above. Similar to the message 1801 transmission, a base station may send, to a wireless device and via DL carrier, a message 2001 for random access procedures. The wireless device may retrieve, from the message 2001, configuration information for a random access procedure associated with the NUL carrier and configuration information for a random access procedure associated with the SUL carrier. The wireless device may determine (e.g., based on the configuration information and/or semi-statically configured information) the maximum number (e.g., three times) of allowed random access attempts for the NUL carrier and the maximum number (e.g., two times) of allowed random access attempts for the SUL carrier. The wireless device may determine a total number of allowed random access attempts for the NUL carrier and the SUL carrier. The wireless device may determine that the wireless device may alternately send random access preambles via the NUL carrier and via the SUL carrier. The wireless device may switch an uplink carrier between the NUL carrier and via the SUL carrier based on an uplink carrier selection mechanism (e.g., predefined order-based, priority-based, random selection-based, DL measurement-based, etc.) described elsewhere in this specification. The wireless device may alternately send random access preambles via the NUL carrier and via the SUL carrier one or more times within the total number of allowed random access attempts.

The wireless device may send, to a base station and via the NUL carrier, a random access preamble 2011 and may monitor for an RAR responsive to the random access preamble 2011 during an RAR window 2021. The wireless device may prepare sending of a random access preamble 2061, for example, after sending the random access preamble 2011 and/or during the RAR window 2021. The wireless device may determine that the RAR responsive to the random access preamble 2011 has not been received. The wireless device may send, to the base station and via the SUL carrier, the random access preamble 2061, for example, after the RAR window 2021 expires. The wireless device may monitor for an RAR responsive to the random access preamble 2061 during an RAR window 2071. The wireless device may prepare sending of a random access preamble 2012, for example, after sending the random access preamble 2061 and/or during the RAR window 2071. The wireless device may determine that the RAR responsive to the random access preamble 2061 has not been received. The wireless device may send, to the base station and via the NUL carrier, a random access preamble 2012 and may monitor for an RAR responsive to the random access preamble 2012 during an RAR window 2022. The wireless device may prepare sending of a random access preamble 2062, for example, after sending the random access preamble 2012 and/or during the RAR window 2022. The wireless device may determine that the RAR responsive to the random access preamble 2012 has not been received. The wireless device may send, to the base station and via the SUL carrier, the random access preamble 2062, for example, after the RAR window 2022 expires. The wireless device may monitor for an RAR responsive to the random access preamble 2062 during an RAR window 2072. The wireless device may prepare sending of a random access preamble 2013, for example, after sending the random access preamble 2062 and/or during the RAR window 2072. The wireless device may receive, during the RAR window 2072 and via the DL carrier, an RAR 2081 for another wireless device. The wireless device may determine that the random access attempt associated with the random access preamble 2062 is unsuccessful. The wireless device may send, to the base station and via the NUL carrier, a random access preamble 2013 and may monitor for an RAR responsive to the random access preamble 2013 during an RAR window 2023. The wireless device may determine that an RAR 2031 responsive to the random access preamble 2013 has been received successfully.

Figure 21:
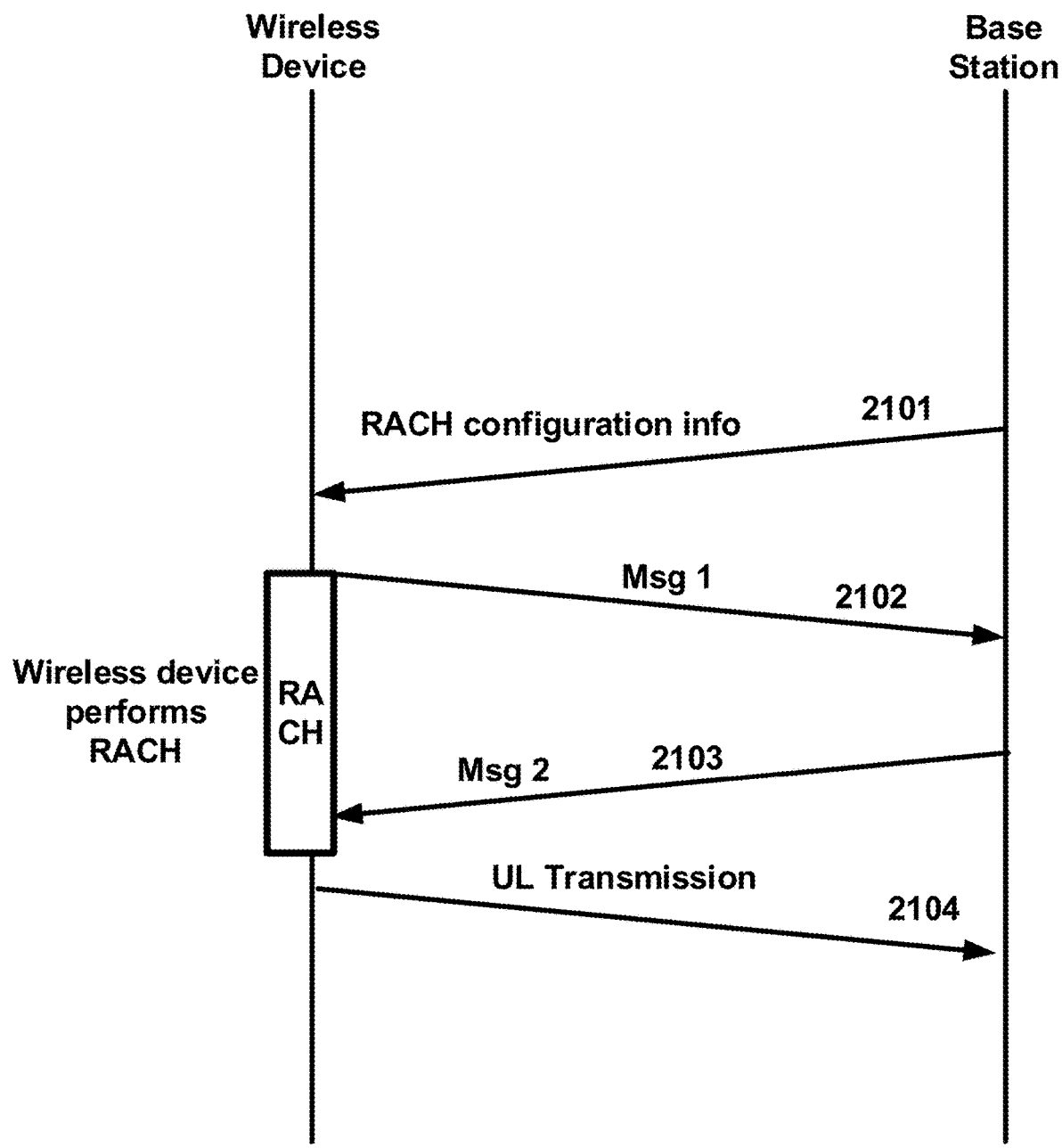
FIG. 21 shows an example random access procedure between a wireless device and a base station.

FIG. 21 shows an example random access procedure between a wireless device and a base station. The random access procedure may be used for a contention-free random access procedure or a contention-based random access procedure. A base station (e.g., a source base station) may send, to a wireless device, RACH configuration information 2101. The RACH configuration information 2101 may comprise information (e.g., a PDCCH order for an SCell addition or an RRC message for a handover) for configuring a plurality of random access procedures. The wireless device may send, to a base station (e.g., the source base station or a target base station), Msg 1 2102 (e.g., a random access preamble), for example, after receiving the RACH configuration information 2101. A base station (e.g., the source base station or a target base station) may send, to the wireless device, Msg2 2103 (e.g., an RAR), for example, after receiving the Msg 1 2102. The wireless device may determine that the random access procedure is successfully completed, for example, after or in response to detecting Msg 2 2103 (e.g., an RAR comprising a preamble identifier corresponding to a preamble that the wireless device transmit via Msg 1 2102). The wireless device may determine that the SCell is successfully added (e.g., the SCell addition triggered by the PDCCH order) or a handover to a target base station is successfully completed, for example, after or in response to detecting Msg 2 2103 transmitted for the wireless device. Normal DL and/or UL transmissions may be scheduled for the wireless device. For example, the wireless device may send, to the base station (e.g., the serving base station or a target base station), a UL signal (e.g., a UL transmission) 2104, for example, after receiving the Msg2 2103.

Figure 22:
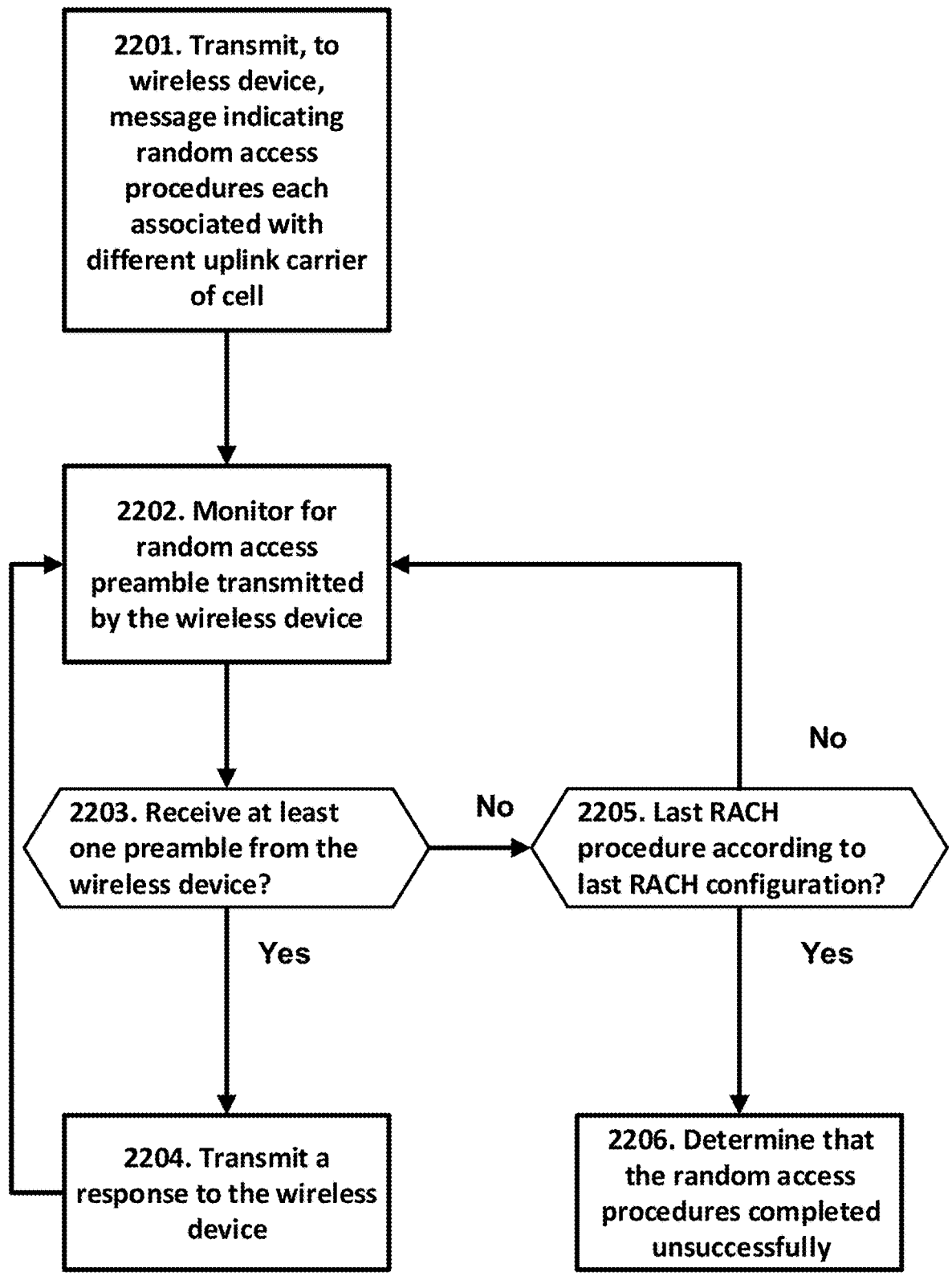
FIG. 22 shows an example of performing a plurality of random access procedures that may be performed by a base station.

FIG. 22 shows an example of performing a plurality of random access procedures that may be performed by a base station. At step 2201, a base station (e.g., a first base station) may send (e.g., transmit, forward, etc.), to a wireless device, a message indicating a plurality of random access procedures. Each of the random access procedures may be associated with a different uplink carrier of a cell. The message may comprise and/or indicate random access configurations for a plurality of uplink carriers of the cell. The cell may be a cell of the first base station or a cell of a second base station. At step 2202, a base station (e.g., the first base station or the second base station) may monitor for a random access preamble sent by the wireless device. At step 2203, the base station may determine whether the base station receives at least one random access preamble sent from the wireless device. At step 2204, the base station may send, to the wireless device, an RAR responsive to the received random access preamble, for example, if the base station receives at least one random access preamble from the wireless device. The base station may consider the random access procedure is successful and may monitor for an uplink transmission (e.g., another random access preamble or an uplink transmission responsive to the RAR) from the wireless device. The base station may repeat step 2202, for example after performing step 2204. At step 2205, the base station may determine whether the current RACH procedure is the last RACH procedure according to the last RACH configuration configured for the wireless device, for example, if the base station does not receive at least one random access preamble from the wireless device. At step 2206, the base station may determine (e.g., consider) that the random access procedures are unsuccessful, for example, if the current RACH procedure is the last RACH procedure for the wireless device. At step 2206, the base station may repeat step 2202, for example, if the current RACH procedure is not the last RACH procedure for the wireless device.

Figure 23:
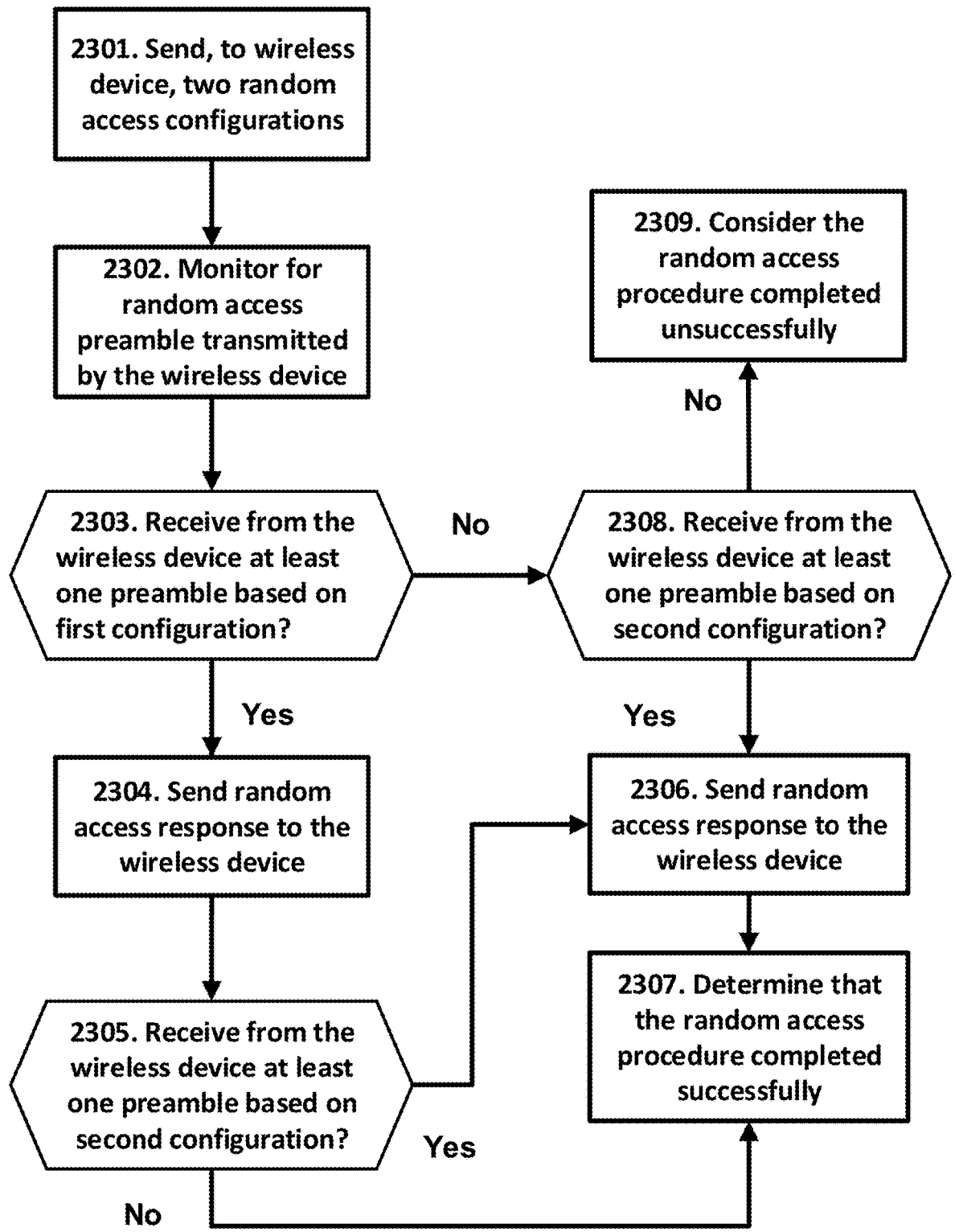
FIG. 23 shows an example of performing a plurality of random access procedures that may be performed by a base station.

FIG. 23 shows an example of performing a plurality of random access procedures that may be performed by a base station. At step 2301, a base station (e.g., a first base station) may send (e.g., transmit), to a wireless device, two random access configurations. The two random access configurations may comprise a first random access configuration for a first uplink carrier of a cell and a second random access configuration for a second uplink carrier of the cell. The cell may be a cell of the first base station or a cell of a second base station. At step 2302, a base station (e.g., the first base station or the second base station) may monitor for a random access preamble sent by the wireless device. At step 2303, the base station may determine whether the base station receives, from the wireless device, at least one random access preamble based on the first random access configuration. At step 2304, the base station may send, to the wireless device, an RAR responsive to the at least one random access preamble that is based on the first random access configuration. The base station may consider the random access procedure is successful, for example, after sending the RAR. At step 2405, the base station may receive, from the wireless device, at least one random access preamble based on the second random access configuration. The base station may determine, based on the at least one random access preamble based on the second random access configuration, the previous random access procedure associated with the first random access configuration was unsuccessful. At step 2306, the base station may send, to the wireless device, an RAR responsive to the at least one random access preamble that is based on the second random access configuration. At step 2307, the base station may determine that (e.g., consider) the random access procedure is successful.

At step 2308, the base station may receive, from the wireless device, at least one random access preamble that is based on the second random access configuration. Step 2308 may be performed, for example, after the base station has failed to receive the at least one random access preamble that is based on the first random access configuration. At step 2306, the base station may send, to the wireless device, an RAR based on (e.g., responsive to) the at least one random access preamble that is based on the second random access configuration, for example, if the base station receives the at least one random access preamble that is based on the second random access configuration. At step 2309, the base station may determine (e.g., consider) the random access procedures are unsuccessful, for example, if the base station does not receive the at least one random access preamble that is based on the second random access configuration (e.g., does not receive a random access preamble for a predefined time period).

Figure 24:
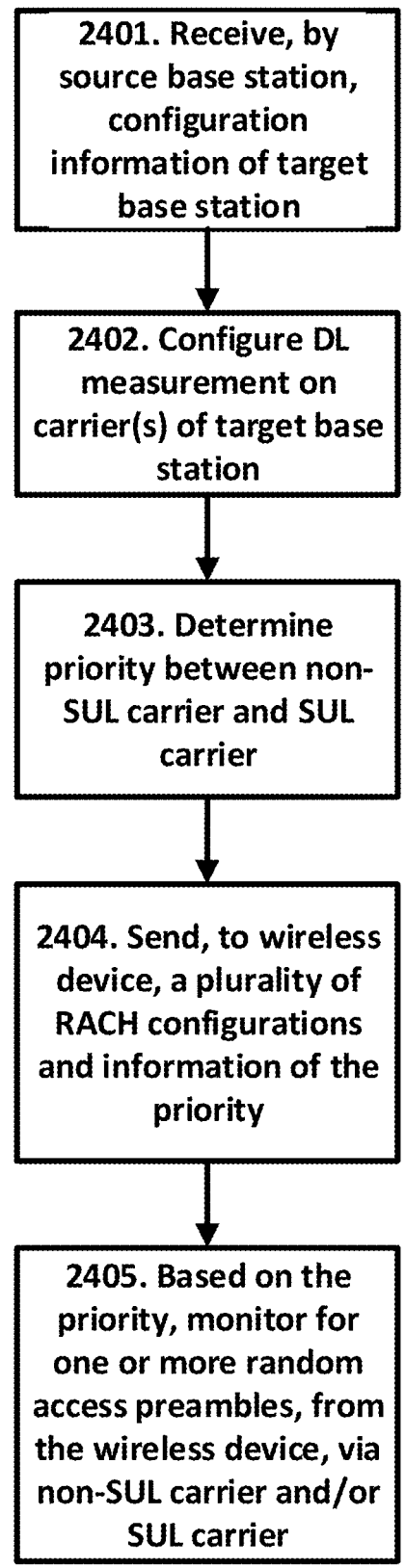
FIG. 24 shows an example of configuring a plurality of random access procedures that may be performed by a base station.

FIG. 24 shows an example of configuring a plurality of random access procedures that may be performed by a base station. At step 2401, a source base station may receive, from a target base station, configuration information of the target base station. The configuration information may comprise information of uplink carriers (e.g., Non-SUL and SUL carriers) of a cell of the target base station. At step 2402, the source base station may configure, for a wireless device, a measurement on one or more carriers of the cell of the target base station (e.g., a DL measurement, on a DL carrier of the cell, comprising RSRP measurement of the DL carrier). The source base station may receive, from the wireless device, one or more measurement reports based on the measurement. At step 2403, the source base station (or the target base station or the user device) may determine a priority between the Non-SUL carrier and the SUL carrier, for example, based on the one or more measurement reports. At step 2404, the source base station, may send, to the wireless device, a plurality of RACH configurations and information of the priority. The information of the priority may be implicitly indicated by sorting the order of the plurality of RACH configurations. For example, as described above, a first RACH configuration associated with the Non-SUL carrier may be listed above a second RACH configuration associated with the SUL carrier. The order of the first RACH configuration and the second RACH configuration may implicitly indicate that the Non-SUL carrier is prioritized over the SUL carrier for random access, and the wireless device may perform a first random access procedure via the non-SUL carrier before performing a second random access procedure via the SUL carrier. At step 2405, the target base station may monitor, based on the priority, for one or more random access preambles sent from the wireless device. For example, the target base station may receive, from the source base station (e.g., via Xn interface), the information of the priority. The target base station may decide the priority and may send, to the source base station, information of the priority. The target base station may monitor, based on the priority, for one or more random access preamble sent on the Non-SUL carrier before monitoring for one or more random access preamble sent on the SUL carrier.

Figure 25:
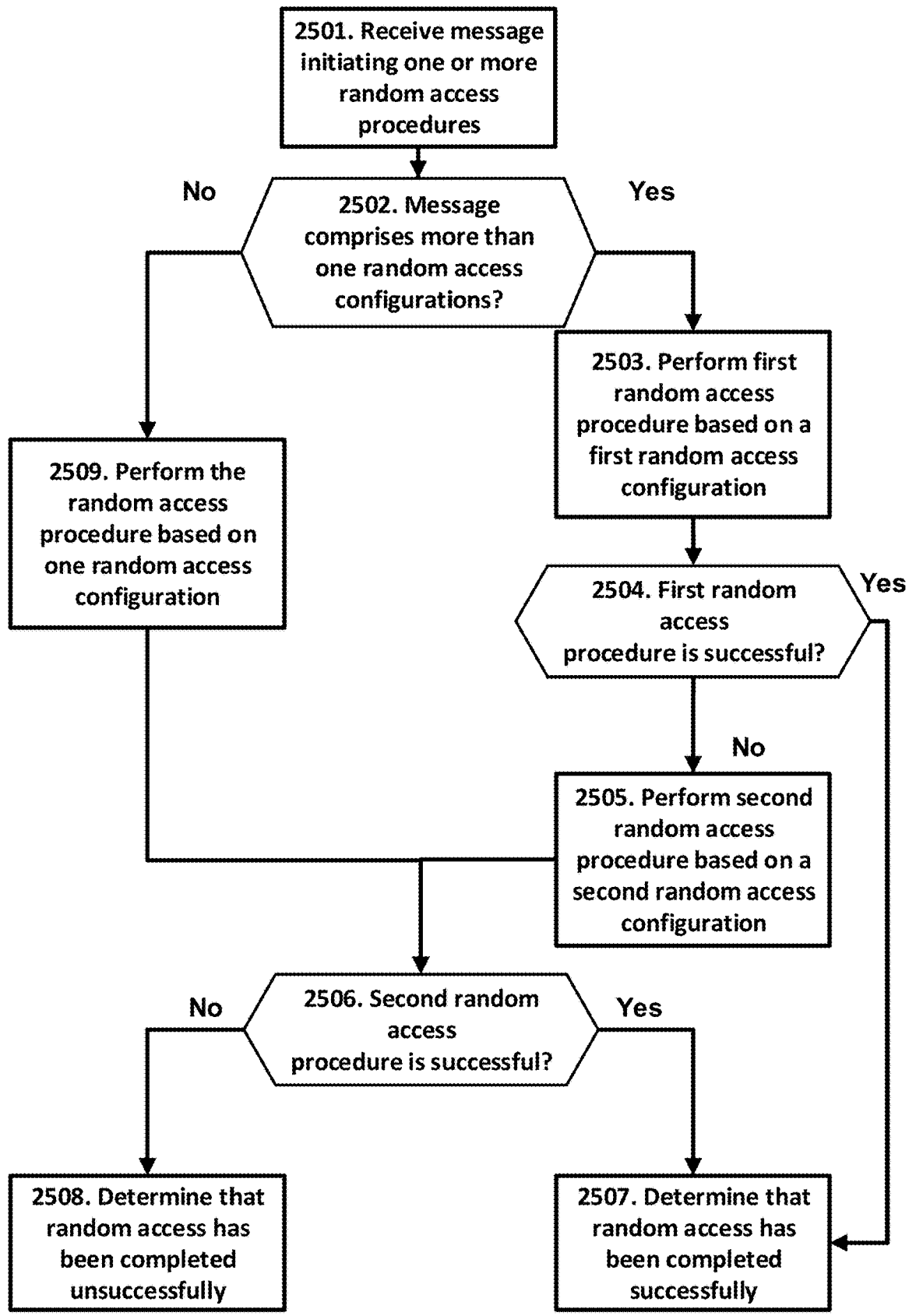
FIG. 25 shows an example of one or more random access procedures that may be performed by a wireless device.

FIG. 25 shows an example of one or more random access procedures that may be performed by a wireless device. At step 2501, the wireless device may receive a message (e.g., one or more messages, such as one or more PDCCH orders, one or more RRC messages, system information blocks, etc.) indicating and initiating one or more random access procedures. At step 2502, the wireless device may determine whether the message comprises more than one random access configurations. The message may comprise a first random access configuration associated with a first uplink carrier of a cell and a second random access configuration associated with a second uplink carrier of the cell. The message may indicate one or more configurations for fallback between the first uplink carrier and the second uplink carrier for random access (e.g., such as shown in FIG. 17). At step 2503, the wireless device may perform a first random access procedure based on the first random access configuration. At step 2504, the wireless device may determine whether the first random access procedure is successful. If so, at step 2507, the wireless device may determine that (e.g., consider) the random access has been successfully completed and may not perform a second random access procedure. At step 2505, the wireless device may perform a second random access procedure based on the second random access configuration, for example, if the wireless device determines that the first random access procedure was unsuccessful. At step 2506, the wireless device may determine whether the second random access procedure is successful. If so, at step 2507, the wireless device may determine that (e.g., consider) the random access has been completed successfully. At step 2508, the wireless device may determine that (e.g., consider) the random access is unsuccessful, for example, if the wireless device determines that the second random access procedure was unsuccessful.

Figure 26:
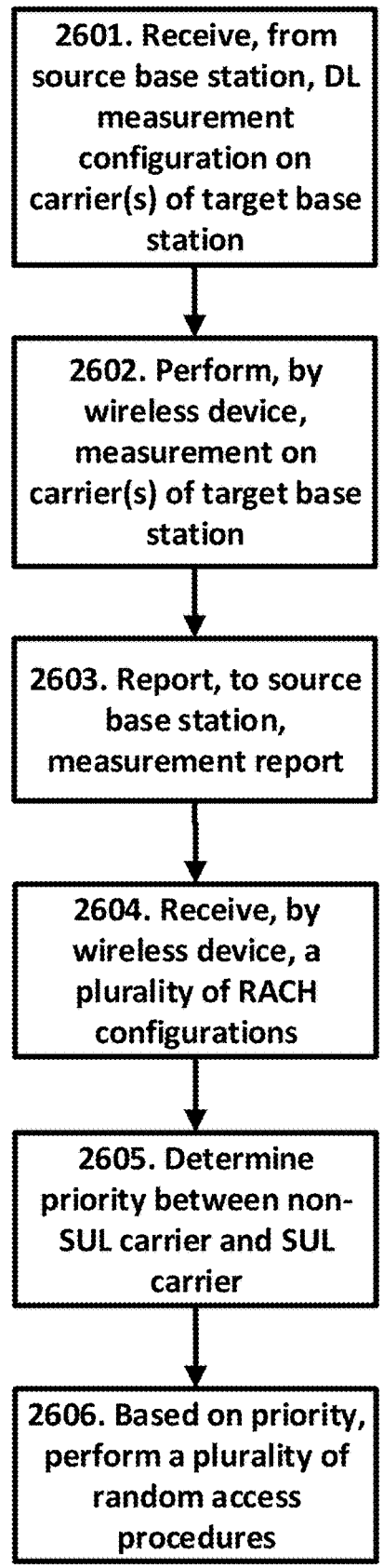
FIG. 26 shows an example of configuring a plurality of random access procedures that may be performed by a wireless device.

FIG. 26 shows an example of configuring a plurality of random access procedures that may be performed by a wireless device. At step 2601, the wireless device may receive, from a source base station, a measurement configuration on one or more carriers of a cell of a target base station (e.g., a DL measurement on a DL carrier of the cell of the target base station). For example, the wireless device may measure RSRP of a DL signal (e.g., a synchronization signal or a CSI-RS) sent from the target base station. At step 2602, the wireless device may perform a measurement on the one or more carriers of the cell. At step 2603, the wireless device may report, to the source base station, one or more measurement reports. At step 2604, the wireless device may receive a plurality of RACH configurations (e.g., from the source base station). At step 2605, the wireless device may determine a priority between a non-SUL carrier and a SUL carrier. At step 2606, the wireless device may perform, based on the priority, a plurality of random access procedures.

A wireless device may receive, from a base station, control information (e.g., one or more messages, an RRC message, a PDCCH order, a DCI, etc.) comprising random access configuration parameters that indicate a first random access channel of a first uplink carrier of a cell and a second random access channel of a second uplink carrier of the cell. The control information may comprise a first indicator indicating that the first uplink carrier is prioritized over the second uplink carrier. The random access configuration parameters may indicate a first bandwidth part of the first uplink carrier comprising the first random access channel and a second bandwidth part of the second uplink carrier comprising the second random access channel. The random access configuration parameters may indicate the at least one first random access preamble and the at least one second random access preamble. The random access configuration parameters may indicate a first plurality of random access preambles, and the wireless device may randomly select the at least one first random access preamble from the first plurality of random access preambles. The random access configuration parameters may indicate a second plurality of random access preambles, and the wireless device may randomly select the at least one second random access preamble from the second plurality of random access preambles. The wireless device may select, based on a selection (e.g., random selection), the first uplink carrier to perform a first random access procedure. The wireless device may send, via the first random access channel of the first uplink carrier, at least one first random access preamble for the first random access procedure. The wireless device may determine that the first random access procedure is unsuccessful (e.g., by determining that no corresponding random access response is received during the first random access procedure). The wireless device may send, via the second random access channel of the second uplink carrier and based on the determining, at least one second random access preamble for a second random access procedure. The control information may comprise a first value indicating a quantity of allowed random access preamble transmissions for the first random access procedure. The wireless device may increment a counter value by one, for example, after or in response to determining that no random access response associated with (e.g., corresponding to) the at least one first random access preamble is received. The wireless device may resend (e.g., retransmit) the at least one first random access preamble, for example, after or in response to the counter value satisfying (e.g., being lower than) the first value. The wireless device may determine that the first random access procedure is unsuccessful, for example, after or in response to the counter value satisfying (e.g., being equal to or higher than) the first value. The control information may comprise a second value (e.g., a threshold power value). The wireless device may measure a received signal power of at least one downlink reference signal and may select, for the first random access procedure and based on the measuring, the first uplink carrier or the second uplink carrier. The wireless device may select the first carrier, for example, based on the received signal power being higher than the second value.

The wireless device may select the second carrier, for example, based on the received signal power being lower than or equal to the second value. The control information may indicate and/or initiate a handover to the cell or may indicate and/or initiates an addition of the cell. The wireless device may receive, from a first base station, the control information (e.g., an RRC signal) indicating a handover to a cell of a second base station. The control information may comprise random access configuration parameters indicating a first random access channel of a first uplink carrier of the cell and a second random access channel of a second uplink carrier of the cell. The wireless device may send, via the first random access channel of the first uplink carrier of the cell, at least one first random access preamble for a first random access procedure. The wireless device may determine that the first random access procedure is unsuccessful (e.g., no corresponding random access response is received for at least one first random access preamble). The wireless device may send, via the second random access channel of the second uplink carrier of the cell and based on the determining, at least one second random access preamble for a second random access procedure. The wireless device may measure a received signal power of at least one downlink reference signal and may select, for the first random access procedure and based on the measuring, the first uplink carrier. The at least one downlink reference signal may comprise one or more of a synchronization signal or a channel state information reference signal. The control information may comprise an access stratum configuration of the second base station. The wireless device may receive, from a base station, control information (e.g., a DCI, a PDCCH order, etc.) indicating an addition of a secondary cell of the base station. The control information may comprise random access configuration parameters indicating a first random access channel of a first uplink carrier of the secondary cell and a second random access channel of a second uplink carrier of the secondary cell. The wireless device may send, via the first random access channel of the first uplink carrier of the secondary cell, at least one first random access preamble for a first random access procedure. The wireless device may determine that the first random access procedure is unsuccessful (e.g., no corresponding random access response is received for at least one first random access preamble). The wireless device may send, via the second random access channel of the second uplink carrier of the secondary cell and based on the determining, at least one second random access preamble for a second random access procedure. The wireless device may measure a received signal power of at least one downlink reference signal of the secondary cell and may select, for the first random access procedure and based on the measuring, the first uplink carrier. The at least one downlink reference signal may comprise one or more of: a synchronization signal or a channel state information reference signal. The first random access procedure and the second random access procedure may be contention-free random access procedures. The random access configuration parameters may comprise an identifier of the wireless device. The wireless device may receive a random access response associated with one of the at least one second random access preamble. The wireless device may send, based on the random access response, a control message comprising the identifier of the wireless device and comprising an indication of a connection reconfiguration complete.

Figure 27:
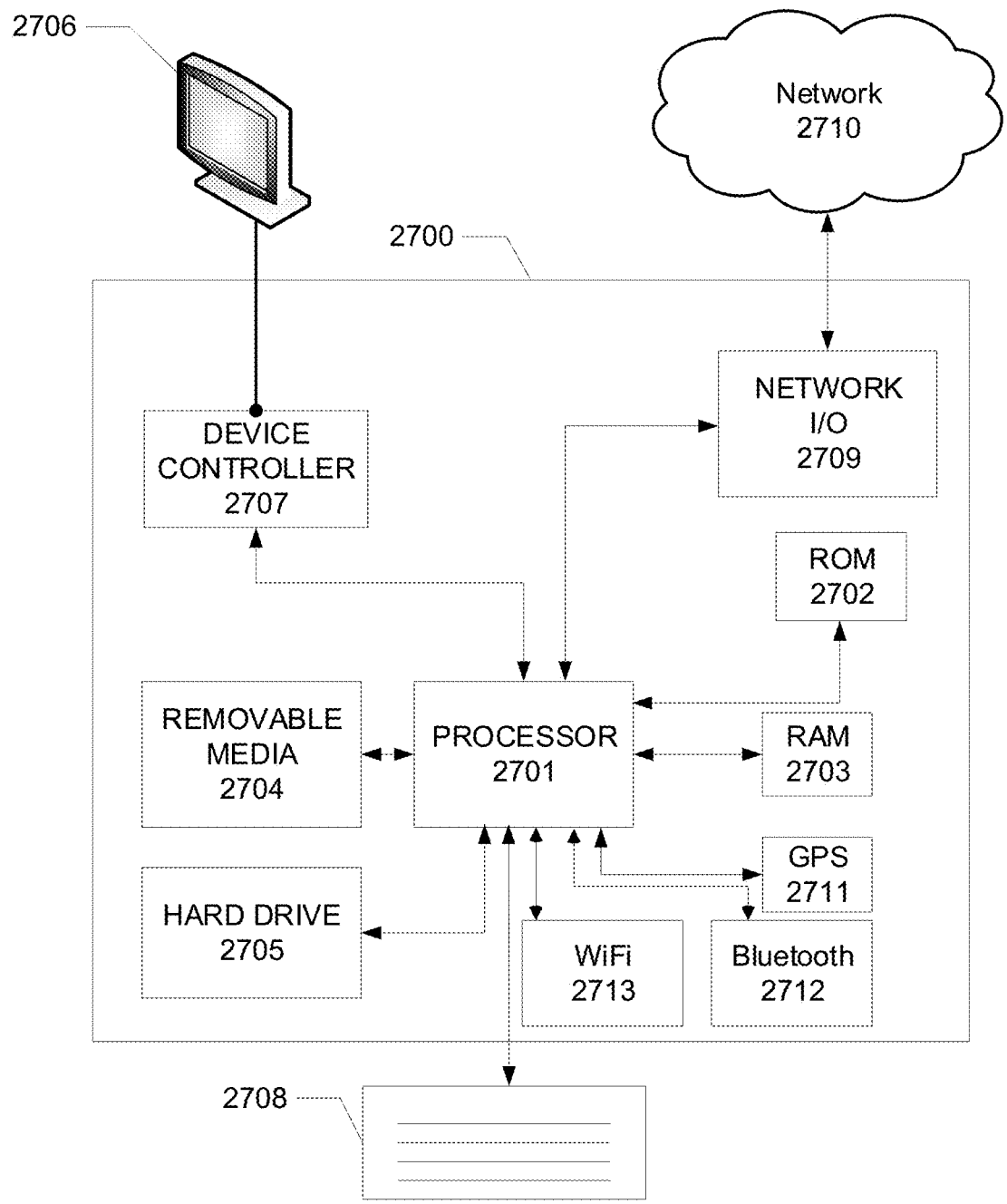
FIG. 27 shows example elements of a computing device that may be used to implement any of the various devices described herein.

FIG. 27 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 2700 may include one or more processors 2701, which may execute instructions stored in the random access memory (RAM) XX03, the removable media 2704 (such as a Universal Serial Bus (USB) drive, compact disk (CD) or digital versatile disk (DVD), or floppy disk drive), or any other desired storage medium. Instructions may also be stored in an attached (or internal) hard drive 2705. The computing device 2700 may also include a security processor (not shown), which may execute instructions of one or more computer programs to monitor the processes executing on the processor 2701 and any process that requests access to any hardware and/or software components of the computing device 2700 (e.g., ROM 2702, RAM 2703, the removable media 2704, the hard drive 2705, the device controller 2707, a network interface 2709, a GPS 2711, a Bluetooth interface 2712, a WiFi interface 2713, etc.). The computing device 2700 may include one or more output devices, such as the display 2706 (e.g., a screen, a display device, a monitor, a television, etc.), and may include one or more output device controllers 2707, such as a video processor. There may also be one or more user input devices 2708, such as a remote control, keyboard, mouse, touch screen, microphone, etc. The computing device 2700 may also include one or more network interfaces, such as a network interface 2709, which may be a wired interface, a wireless interface, or a combination of the two. The network interface 2709 may provide an interface for the computing device 2700 to communicate with a network 2710 (e.g., a RAN, or any other network). The network interface 2709 may include a modem (e.g., a cable modem), and the external network 2710 may include communication links, an external network, an in-home network, a provider's wireless, coaxial, fiber, or hybrid fiber/coaxial distribution system (e.g., a DOCSIS network), or any other desired network. Additionally, the computing device 2700 may include a location-detecting device, such as a global positioning system (GPS) microprocessor 2711, which may be configured to receive and process global positioning signals and determine, with possible assistance from an external server and antenna, a geographic position of the computing device 2700.

The example in FIG. 27 may be a hardware configuration, although the components shown may be implemented as software as well. Modifications may be made to add, remove, combine, divide, etc. components of the computing device 2700 as desired. Additionally, the components may be implemented using basic computing devices and components, and the same components (e.g., processor 2701, ROM storage 2702, display 2706, etc.) may be used to implement any of the other computing devices and components described herein. For example, the various components described herein may be implemented using computing devices having components such as a processor executing computer-executable instructions stored on a computer-readable medium, as shown in FIG. 27. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
  receiving, by a wireless device, one or more configuration parameters indicating a plurality of random access channel resources of a cell;
  receiving control information that is configured to cause random access preamble transmission and that indicates:
    a first uplink carrier of the cell for a first random access procedure; and
    a second uplink carrier of the cell for a second random access procedure;
  sending, via the first uplink carrier and based on the control information, at least one first random access preamble for the first random access procedure; and
  based on a determination that the first random access procedure is unsuccessful, sending, via the second uplink carrier and based on the control information, at least one second random access preamble for the second random access procedure.

2. The method of claim 1, wherein the receiving the control information comprises:
  receiving one or more messages indicating a handover to the cell, wherein the cell is associated with a target base station.

3. The method of claim 1, wherein the control information comprises a plurality of random access parameters that indicate:
  a first bandwidth part, of the first uplink carrier, comprising a first random access channel resource, of the plurality of random access channel resources, for the first uplink carrier, and
  a second bandwidth part, of the second uplink carrier, comprising a second random access channel resource, of the plurality of random access channel resources, for the second uplink carrier.

4. The method of claim 1, wherein the control information comprises a plurality of random access parameters that indicate:
  the at least one first random access preamble; and
  the at least one second random access preamble.

5. The method of claim 1, wherein the control information further indicates that the first uplink carrier is prioritized over the second uplink carrier.

6. The method of claim 1, wherein the control information further indicates an addition of the cell, and
  wherein the cell is a secondary cell of a base station.

7. The method of claim 1, further comprising determining, based on a first value indicating a quantity of allowed random access preamble transmissions for the first random access procedure, that the first random access procedure is unsuccessful,
  wherein the control information comprises the first value.

8. The method of claim 1, further comprising:
  measuring a received signal power of at least one downlink reference signal; and
  selecting, for the first random access procedure and based on the measuring, the first uplink carrier.

9. The method of claim 1, wherein the first random access procedure and the second random access procedure are contention-free random access procedures.

10. The method of claim 1, further comprising:
receiving a random access response associated with one of the at least one second random access preamble; and
sending, based on the random access response, a control message comprising:
an identifier of the wireless device; and
an indication of a connection reconfiguration complete message,
wherein the control information comprises a plurality of random access parameters that comprise the identifier of the wireless device.

11. The method of claim 1, wherein the one or more configuration parameters indicates:
a set of first random access channel resources comprising a first random access channel resource, of the plurality of random access channel resources, for the first uplink carrier; and
a set of second random access channel resources comprising a second random access channel resource, of the plurality of random access channel resources, for the second uplink carrier.

12. The method of claim 1, wherein the control information is associated with at least one of:
a handover to the cell;
an addition of a secondary cell of a base station; or
a physical downlink control channel order.

13. The method of claim 1, wherein the first uplink carrier is a non-supplementary uplink carrier of the cell, and the second uplink carrier is a supplementary uplink carrier of the cell.

14. A method comprising:
receiving, by a wireless device, one or more configuration parameters indicating a plurality of random access channel resources of a cell;
receiving control information that is configured to cause random access preamble transmission and that indicates:
a first uplink carrier of the cell for a first random access procedure; and
a second uplink carrier of the cell for a second random access procedure;
sending, via the first uplink carrier and based on the control information, at least one first random access preamble for the first random access procedure; and
based on a determination whether the first random access procedure is successful, sending an uplink transmission via at least one of the first uplink carrier or the second uplink carrier.

15. The method of claim 14, wherein the sending the uplink transmission comprises:
based on a determination that the first random access procedure is unsuccessful, sending, via the second uplink carrier and based on the control information, at least one second random access preamble for the second random access procedure.

16. The method of claim 14, wherein the control information is associated with at least one of:
a handover to the cell;
an addition of a secondary cell of a base station; or
a physical downlink control channel order.

17. The method of claim 14, wherein the first uplink carrier is a non-supplementary uplink carrier of the cell, and the second uplink carrier is a supplementary uplink carrier of the cell.

18. The method of claim 14, wherein the sending the uplink transmission comprises:
based on a determination that the first random access procedure is successful, sending the uplink transmission via the first uplink carrier.

19. The method of claim 14, further comprising:
receiving downlink control information associated with the at least one first random access preamble,
wherein the sending the uplink transmission comprises sending, after receiving the downlink control information, at least one transport block via the first uplink carrier.

20. A wireless device comprising:
one or more processors; and
memory storing instructions that, when executed by the one or more processors, cause the wireless device to:
receive one or more configuration parameters indicating a plurality of random access channel resources of a cell;
receive control information that is configured to cause random access preamble transmission and that indicates:
a first uplink carrier of the cell for a first random access procedure; and
a second uplink carrier of the cell for a second random access procedure;
send, via the first uplink carrier and based on the control information, at least one first random access preamble for the first random access procedure; and
based on a determination that the first random access procedure is unsuccessful, send, via the second uplink carrier and based on the control information, at least one second random access preamble for the second random access procedure.

21. The wireless device of claim 20, wherein the instructions, when executed by the one or more processors, cause the wireless device to receive the control information by:
receiving one or more messages indicating a handover to the cell, wherein the cell is associated with a target base station.

22. The wireless device of claim 20, wherein the control information comprises a plurality of random access parameters that indicate:
a first bandwidth part, of the first uplink carrier, comprising a first random access channel resource, of the plurality of random access channel resources, for the first uplink carrier, and
a second bandwidth part, of the second uplink carrier, comprising a second random access channel resource, of the plurality of random access channel resources, for the second uplink carrier.

23. The wireless device of claim 20, wherein the control information comprises a plurality of random access parameters that indicate:
the at least one first random access preamble; and
the at least one second random access preamble.

24. The wireless device of claim 20, wherein the control information further indicates that the first uplink carrier is prioritized over the second uplink carrier.

25. The wireless device of claim 20, wherein the control information further indicates an addition of the cell, and wherein the cell is a secondary cell of a base station.

26. The wireless device of claim 20, wherein the instructions, when executed by the one or more processors, cause the wireless device to determine, based on a first value indicating a quantity of allowed random access preamble transmissions for the first random access procedure, that the first random access procedure is unsuccessful, and
wherein the control information comprises the first value.

27. The wireless device of claim 20, wherein the instructions, when executed by the one or more processors, cause the wireless device to:
measure a received signal power of at least one downlink reference signal; and
select, for the first random access procedure and based on measuring the received signal power, the first uplink carrier.

28. The wireless device of claim 20, wherein the first random access procedure and the second random access procedure are contention-free random access procedures.

29. The wireless device of claim 20, wherein the instructions, when executed by the one or more processors, cause the wireless device to:
receive a random access response associated with one of the at least one second random access preamble; and
send, based on the random access response, a control message comprising:
an identifier of the wireless device; and
an indication of a connection reconfiguration complete message, and
wherein the control information comprises a plurality of random access parameters that comprise the identifier of the wireless device.

30. The wireless device of claim 20, wherein the one or more configuration parameters indicates:
a set of first random access channel resources comprising a first random access channel resource, of the plurality of random access channel resources, for the first uplink carrier; and
a set of second random access channel resources comprising a second random access channel resource, of the plurality of random access channel resources, for the second uplink carrier.

31. The wireless device of claim 20, wherein the control information is associated with at least one of:
a handover to the cell;
an addition of a secondary cell of a base station; or
a physical downlink control channel order.

32. The wireless device of claim 20, wherein the first uplink carrier is a non-supplementary uplink carrier of the cell, and the second uplink carrier is a supplementary uplink carrier of the cell.

33. A wireless device comprising:
one or more processors; and
memory storing instructions that, when executed by the one or more processors, cause the wireless device to:
receive one or more configuration parameters indicating a plurality of random access channel resources of a cell;
receive control information that is configured to cause random access preamble transmission and that indicates:
a first uplink carrier of the cell for a first random access procedure; and
a second uplink carrier of the cell for a second random access procedure;
send, via the first uplink carrier and based on the control information, at least one first random access preamble for the first random access procedure; and
based on a determination whether the first random access procedure is successful, send an uplink transmission via at least one of the first uplink carrier or the second uplink carrier.

34. The wireless device of claim 33, wherein the instructions, when executed by the one or more processors, cause the wireless device to send the uplink transmission by:
based on a determination that the first random access procedure is unsuccessful, sending, via the second uplink carrier and based on the control information, at least one second random access preamble for the second random access procedure.

35. The wireless device of claim 33, wherein the control information is associated with at least one of:
a handover to the cell;
an addition of a secondary cell of a base station; or
a physical downlink control channel order.

36. The wireless device of claim 33, wherein the first uplink carrier is a non-supplementary uplink carrier of the cell, and the second uplink carrier is a supplementary uplink carrier of the cell.

37. The wireless device of claim 33, wherein the instructions, when executed by the one or more processors, cause the wireless device to send the uplink transmission by:
based on a determination that the first random access procedure is successful, sending the uplink transmission via the first uplink carrier.

38. The wireless device of claim 33, wherein the instructions, when executed by the one or more processors, cause the wireless device to:
receive downlink control information associated with the at least one first random access preamble; and
send the uplink transmission by sending, after receiving the downlink control information, at least one transport block via the first uplink carrier.

39. A non-transitory computer-readable medium storing instructions that, when executed, configure a wireless device to:
receive one or more configuration parameters indicating a plurality of random access channel resources of a cell;
receive control information that is configured to cause random access preamble transmission and that indicates:
a first uplink carrier of the cell for a first random access procedure; and
a second uplink carrier of the cell for a second random access procedure;
send, via the first uplink carrier and based on the control information, at least one first random access preamble for the first random access procedure; and
based on a determination that the first random access procedure is unsuccessful, send, via the second uplink carrier and based on the control information, at least one second random access preamble for the second random access procedure.

40. The non-transitory computer-readable medium of claim 39, wherein the instructions, when executed, further configure the wireless device to receive the control information by:
receiving one or more messages indicating a handover to the cell, wherein the cell is associated with a target base station.

41. The non-transitory computer-readable medium of claim 39, wherein the control information comprises a plurality of random access parameters that indicate:
a first bandwidth part, of the first uplink carrier, comprising a first random access channel resource, of the plurality of random access channel resources, for the first uplink carrier, and a second bandwidth part, of the second uplink carrier, comprising a second random access channel resource, of the plurality of random access channel resources, for the second uplink carrier.

42. The non-transitory computer-readable medium of claim 39, wherein the control information comprises a plurality of random access parameters that indicate:
the at least one first random access preamble; and
the at least one second random access preamble.

43. The non-transitory computer-readable medium of claim 39, wherein the control information further indicates that the first uplink carrier is prioritized over the second uplink carrier.

44. The non-transitory computer-readable medium of claim 39, wherein the control information further indicates an addition of the cell, and
wherein the cell is a secondary cell of a base station.

45. The non-transitory computer-readable medium of claim 39, wherein the instructions, when executed, further configure the wireless device to determine, based on a first value indicating a quantity of allowed random access preamble transmissions for the first random access procedure, that the first random access procedure is unsuccessful, and
wherein the control information comprises the first value.

46. The non-transitory computer-readable medium of claim 39, wherein the instructions, when executed, further configure the wireless device to:
measure a received signal power of at least one downlink reference signal; and
select, for the first random access procedure and based on measuring the received signal power, the first uplink carrier.

47. The non-transitory computer-readable medium of claim 39, wherein the first random access procedure and the second random access procedure are contention-free random access procedures.

48. The non-transitory computer-readable medium of claim 39, wherein the instructions, when executed, further configure the wireless device to:
receive a random access response associated with one of the at least one second random access preamble; and
send, based on the random access response, a control message comprising:
an identifier of the wireless device; and
an indication of a connection reconfiguration complete message, and
wherein the control information comprises a plurality of random access parameters that comprise the identifier of the wireless device.

49. The non-transitory computer-readable medium of claim 39, wherein the one or more configuration parameters indicates:
a set of first random access channel resources comprising a first random access channel resource, of the plurality of random access channel resources, for the first uplink carrier; and
a set of second random access channel resources comprising a second random access channel resource, of the plurality of random access channel resources, for the second uplink carrier.

50. The non-transitory computer-readable medium of claim 39, wherein the control information is associated with at least one of:
a handover to the cell;
an addition of a secondary cell of a base station; or
a physical downlink control channel order.

51. The non-transitory computer-readable medium of claim 39, wherein the first uplink carrier is a non-supplementary uplink carrier of the cell, and the second uplink carrier is a supplementary uplink carrier of the cell.

52. A non-transitory computer-readable medium storing instructions that, when executed, configure a wireless device to:
receive one or more configuration parameters indicating a plurality of random access channel resources of a cell;
receive control information that is configured to cause random access preamble transmission and that indicates:
a first uplink carrier of the cell for a first random access procedure; and
a second uplink carrier of the cell for a second random access procedure;
send, via the first uplink carrier and based on the control information, at least one first random access preamble for the first random access procedure; and
based on a determination whether the first random access procedure is successful, send an uplink transmission via at least one of the first uplink carrier or the second uplink carrier.

53. The non-transitory computer-readable medium of claim 52, wherein the instructions, when executed, further configure the wireless device to send the uplink transmission by:
based on a determination that the first random access procedure is unsuccessful, sending, via the second uplink carrier and based on the control information, at least one second random access preamble for the second random access procedure.

54. The non-transitory computer-readable medium of claim 52, wherein the control information is associated with at least one of:
a handover to the cell;
an addition of a secondary cell of a base station; or
a physical downlink control channel order.

55. The non-transitory computer-readable medium of claim 52, wherein the first uplink carrier is a non-supplementary uplink carrier of the cell, and the second uplink carrier is a supplementary uplink carrier of the cell.

56. The non-transitory computer-readable medium of claim 52, wherein the instructions, when executed, further configure the wireless device to send the uplink transmission by:
based on a determination that the first random access procedure is successful, sending the uplink transmission via the first uplink carrier.

57. The non-transitory computer-readable medium of claim 52, wherein the instructions, when executed, further configure the wireless device to:
receive downlink control information associated with the at least one first random access preamble; and
send the uplink transmission by sending, after receiving the downlink control information, at least one transport block via the first uplink carrier.

58. A system comprising:
a base station; and
a wireless device,
wherein the base station is configured to:
send one or more configuration parameters indicating a plurality of random access channel resources of a cell; and
send control information that is configured to cause random access preamble transmission and that indicates:

a first uplink carrier of the cell for a first random access procedure; and
a second uplink carrier of the cell for a second random access procedure; and
wherein the wireless device is configured to:
send, via the first uplink carrier and based on the control information, at least one first random access preamble for the first random access procedure; and
based on a determination that the first random access procedure is unsuccessful, send, via the second uplink carrier and based on the control information, at least one second random access preamble for the second random access procedure.

59. The system of claim 58, wherein the base station is further configured to send the control information by:
sending one or more messages indicating a handover to the cell, wherein the cell is associated with a target base station.

60. The system of claim 58, wherein the control information comprises a plurality of random access parameters that indicate:
a first bandwidth part, of the first uplink carrier, comprising a first random access channel resource, of the plurality of random access channel resources, for the first uplink carrier, and
a second bandwidth part, of the second uplink carrier, comprising a second random access channel resource, of the plurality of random access channel resources, for the second uplink carrier.

61. The system of claim 58, wherein the control information comprises a plurality of random access parameters that indicate:
the at least one first random access preamble; and
the at least one second random access preamble.

62. The system of claim 58, wherein the control information further indicates that the first uplink carrier is prioritized over the second uplink carrier.

63. The system of claim 58, wherein the control information further indicates an addition of the cell, and
wherein the cell is a secondary cell of a base station.

64. The system of claim 58, wherein the wireless device is further configured to determine, based on a first value indicating a quantity of allowed random access preamble transmissions for the first random access procedure, that the first random access procedure is unsuccessful, and
wherein the control information comprises the first value.

65. The system of claim 58, wherein the wireless device is further configured to:
measure a received signal power of at least one downlink reference signal; and
select, for the first random access procedure and based on measuring the received signal power, the first uplink carrier.

66. The system of claim 58, wherein the first random access procedure and the second random access procedure are contention-free random access procedures.

67. The system of claim 58, wherein the base station is further configured to send a random access response associated with one of the at least one second random access preamble; and
wherein the wireless device is further configured to send, based on the random access response, a control message comprising:
an identifier of the wireless device; and
an indication of a connection reconfiguration complete message, and
wherein the control information comprises a plurality of random access parameters that comprise the identifier of the wireless device.

68. The system of claim 58, wherein the one or more configuration parameters indicates:
a set of first random access channel resources comprising a first random access channel resource, of the plurality of random access channel resources, for the first uplink carrier; and
a set of second random access channel resources comprising a second random access channel resource, of the plurality of random access channel resources, for the second uplink carrier.

69. The system of claim 58, wherein the control information is associated with at least one of:
a handover to the cell;
an addition of a secondary cell of a base station; or
a physical downlink control channel order.

70. The system of claim 58, wherein the first uplink carrier is a non-supplementary uplink carrier of the cell, and the second uplink carrier is a supplementary uplink carrier of the cell.

71. A system comprising:
a base station; and
a wireless device,
wherein the base station is configured to:
send one or more configuration parameters indicating a plurality of random access channel resources of a cell; and
send control information that is configured to cause random access preamble transmission and that indicates:
a first uplink carrier of the cell for a first random access procedure; and
a second uplink carrier of the cell for a second random access procedure; and
wherein the wireless device is configured to:
send, via the first uplink carrier and based on the control information, at least one first random access preamble for the first random access procedure; and
based on a determination whether the first random access procedure is successful, send an uplink transmission via at least one of the first uplink carrier or the second uplink carrier.

72. The system of claim 71, wherein the wireless device is further configured to send the uplink transmission by:
based on a determination that the first random access procedure is unsuccessful, sending, via the second uplink carrier and based on the control information, at least one second random access preamble for the second random access procedure.

73. The system of claim 71, wherein the control information is associated with at least one of:
a handover to the cell;
an addition of a secondary cell of a base station; or
a physical downlink control channel order.

74. The system of claim 71, wherein the first uplink carrier is a non-supplementary uplink carrier of the cell, and the second uplink carrier is a supplementary uplink carrier of the cell.

75. The system of claim 71, wherein the wireless device is further configured to send the uplink transmission by:
based on a determination that the first random access procedure is successful, sending the uplink transmission via the first uplink carrier.

76. The system of claim 71, wherein the base station is further configured to send downlink control information associated with the at least one first random access preamble; and wherein the wireless device is further configured to send the uplink transmission by sending, after receiving the downlink control information, at least one transport block via the first uplink carrier.

* * * * *

UNITED STATES PATENT AND TRADEMARK OFFICE
CERTIFICATE OF CORRECTION

PATENT NO. : 11,690,102 B2
APPLICATION NO. : 17/159866
DATED : June 27, 2023
INVENTOR(S) : Jeon et al.

Page 1 of 2

It is certified that error appears in the above-identified patent and that said Letters Patent is hereby corrected as shown below:

In the Specification

Column 10, Detailed Description, Line 49:
Delete "MasterinformationBlock" and insert --MasterInformationBlock-- therefor Column 12, Detailed Description, Line 48:
After "station 2", insert --120B-- therefor Column 14, Detailed Description, Line 9:
After "channel", insert --.-- therefor Column 18, Detailed Description, Line 19:
Delete "ADM-RS" and insert --A DM-RS-- therefor Column 20, Detailed Description, Line 56:
Delete "a" and insert --A-- therefor Column 24, Detailed Description, Line 63:
Delete "statin" and insert --station-- therefor Column 27, Detailed Description, Line 8:
Delete "1119)." and insert --1118).-- therefor Column 31, Detailed Description, Line 51:
Delete "1250," and insert --1240,-- therefor Column 32, Detailed Description, Line 35:
After "channel", insert --.-- therefor Signed and Sealed this
Twenty-fourth Day of September, 2024

Katherine Kelly Vidal
*Director of the United States Patent and Trademark Office*

CERTIFICATE OF CORRECTION (continued)
U.S. Pat. No. 11,690,102 B2

Column 61, Detailed Description, Line 20:
Delete "Lab VIEWMathScript." and insert --LabVIEWMathScript.-- therefor Column 62, Detailed Description, Lines 1-2:
After "manner", insert --.-- therefor